(12) United States Patent
Tsuda

(10) Patent No.: US 6,697,160 B2
(45) Date of Patent: Feb. 24, 2004

(54) LIGHT WAVELENGTH MEASURING APPARATUS AND METHOD FOR MEASURING WAVELENGTH OF SUBJECT LIGHT WITH HIGH SPEED BY USING TWO-BEAM INTERFEROMETER

(75) Inventor: Yukio Tsuda, Kanagawa-ken (JP)

(73) Assignee: Anritsu Corporation, Tokyo (JP)

( * ) Notice: Subject to any disclaimer, the term of this patent is extended or adjusted under 35 U.S.C. 154(b) by 238 days.

(21) Appl. No.: 10/032,186

(22) Filed: Dec. 21, 2001

(65) Prior Publication Data
US 2002/0118368 A1 Aug. 29, 2002

(30) Foreign Application Priority Data
Dec. 28, 2000 (JP) ....................... 2000-402120

(51) Int. Cl.[7] ................................................. G01B 9/02
(52) U.S. Cl. ....................... 356/491; 356/453
(58) Field of Search .................. 356/450, 451, 356/453, 491, 517

(56) References Cited

U.S. PATENT DOCUMENTS 5,841,536 A * 11/1998 Dimmick ............... 356/491
6,249,350 B1 * 6/2001 Dultz et al. ............ 356/491
6,462,827 B1 * 10/2002 Frankel .................. 356/491
6,507,404 B1 * 1/2003 Nishioki et al. ........ 356/450

FOREIGN PATENT DOCUMENTS

JP          3-279824 A    12/1991
JP          6-18332 A     1/1994

* cited by examiner

Primary Examiner—Frank G. Font
Assistant Examiner—Andrew H. Lee
(74) Attorney, Agent, or Firm—Frishauf, Holtz, Goodman & Chick, P.C.

(57) ABSTRACT

A two-beam interferometer splits an incident light in two optical paths, combines and outputs split lights together again. The two-beam interferometer generates at least one or more combined light made from two beams each having a polarization different from each other. A polarization state detector detects a variation in the polarization of the combined light generated by the two-beam interferometer. An electric circuit calculates an wavelength of the incident light based on the variation in the polarization detected by the polarization state detector. The two optical paths of the two-beam interferometer has a difference in length between a point of splitting the incident light and a point of combining the split lights, for the detection of polarization variation in the combined light by the polarization state detector. The optical path length difference between the two paths is fixed.

12 Claims, 20 Drawing Sheets

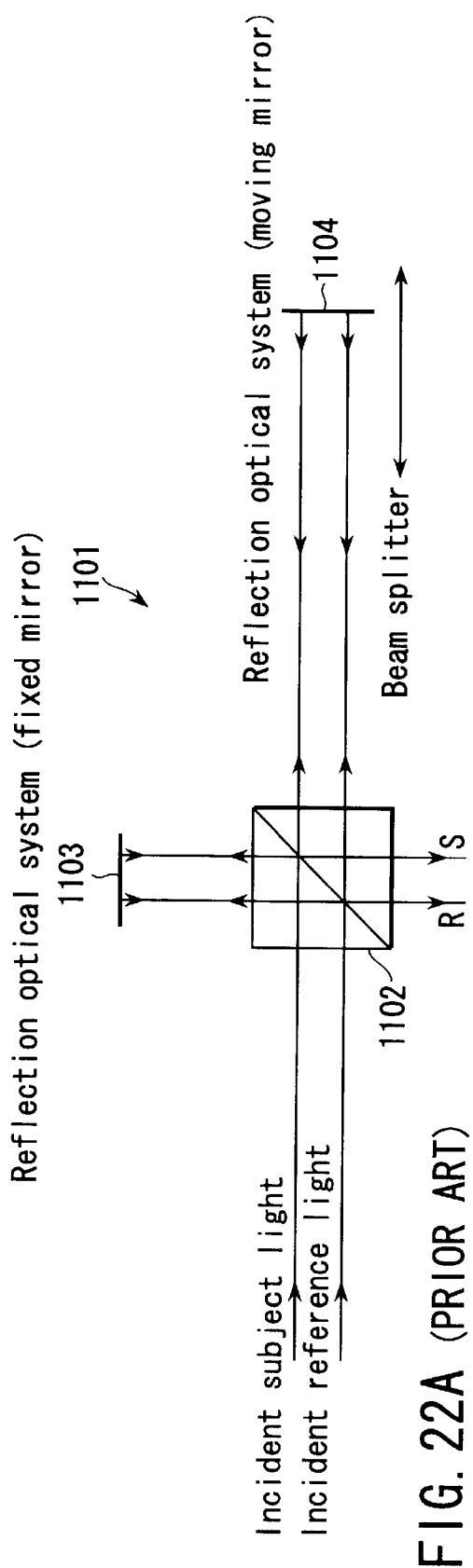
FIG. 22A (PRIOR ART)
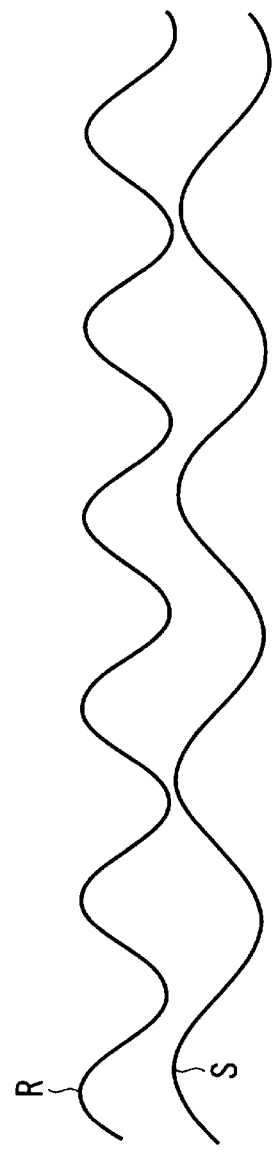
FIG. 22B (PRIOR ART)
FIG. 22C (PRIOR ART)

LIGHT WAVELENGTH MEASURING APPARATUS AND METHOD FOR MEASURING WAVELENGTH OF SUBJECT LIGHT WITH HIGH SPEED BY USING TWO-BEAM INTERFEROMETER

CROSS-REFERENCE TO RELATED APPLICATIONS

This application is based upon and claims the benefit of priority from the prior Japanese Patent Application No. 2000-402120, filed Dec. 28, 2000, the entire contents of which are incorporated herein by reference.

BACKGROUND OF THE INVENTION

1. Field of the Invention

The present invention relates to a light wavelength measuring apparatus that uses a two-beam interferometer and a measuring method therefor. Particularly, the present invention relates to a light wavelength measuring apparatus that measures a wavelength of an incident light to be measured by using a two-beam interferometer, wherein the wavelength of the subject light is measured with high speed and a method therefor.

2. Description of the Related Art

FIG. 22A shows a configuration of a principal portion of a prior-art light wavelength measuring apparatus which uses a two-beam interferometer, which is disclosed in Jpn. Pat. Appln. KOKAI Publication No. 3-279824.

FIGS. 22B and 22C show waveforms of a reference light R and a subject light S coming out of a beam splitter 1102 in FIG. 22A.

Specifically, a light wavelength measuring apparatus 1101 as shown in FIG. 22A is mainly configured by a two-beam interferometer which comprises: a beam splitter 1102 disposed on an optical path to which a subject light and a reference light having a known wavelength are incident; a fixed mirror 1103 serving as a reflection optical system disposed on an optical path of one of the two beams split by the beam splitter 1102; and a movable mirror 1104 serving as another reflection optical system disposed on an optical path of the other of the two beams split by the beam splitter 1102.

According to the light wavelength measuring apparatus 1101 which uses the two-beam interferometer of the above configuration, the subject light, and the reference light having a known wavelength are introduced into the beam splitter 1102. The beam splitter 1102 splits each of the lights for reflection by the fixed mirror 1103 and the movable mirror 1104.

Then, the beams incident on the fixed mirror 1103 and the movable mirror 1104 are reflected back to the beam splitter 1102, combined together by the beam splitter 1102 into respective single beams, and then come out as the reference light R and the subject light S.

In the above, the movable mirror 1104 is moved by a predetermined distance. This causes, as shown in FIGS. 22B and 22C respectively, a power shift or a shift of sine wave in each of the reference light R and the subject light S that are combined and come out by the beam splitter 1102.

In the above, assuming that an optical path difference between the reference light R and the subject light S (a difference in distance between the two optical paths from the point of splitting by the beam splitter 1102 to the combining thereby) is x, an index of refraction is n, and a wavelength of the incident light is $\lambda$, there is generated an interference light component of $\cos(nx/\lambda)$ in the combined light power.

In order to obtain the wavelength of the subject light, as shown in FIG. 23, a calculation is performed to obtain a wave number k which crosses a reference level L in the combined light power, for each of the reference light R and the subject light S.

Then, calculating means (not shown) calculates the wavelength $\lambda$ of the subject light, based on a ratio of the wave numbers in the reference light R and the subject light S, and on a value of the known wavelength of the reference light as follows:

$$nx = k \cdot \lambda$$

$$\lambda = nx/k$$

The result of the calculation is outputted.

According to the light wavelength measuring apparatus 1101 which uses the conventional two-beam interferometer as described above, in order to obtain the wavelength of the subject light, it is necessary to move the movable mirror 1104 by a predetermined distance and to obtain the wave number ratio of the interference fringe between the reference light and the subject light. For this reason, it is only after the movable mirror 1104 has been moved that the measurement result can be obtained.

Therefore, according to the light wavelength measuring apparatus 1101 which uses the conventional two-beam interferometer, a certain time must be used for moving the movable mirror 1104. This poses a problem that it is impossible to shorten a measuring time.

Now, the sine curve shift in the output beam power from the two-beam interferometer occurs not only when the movable mirror 1104 is moved but also when there is a change in the wavelength of the incident light, as shown in FIG. 24.

This relationship can be utilized in order to improve the light wavelength measuring apparatus 1101 which uses the conventional two-beam interferometer, thereby achieving a reduction in the measuring time. Specifically, the movable mirror 1104 is fixed, and change in the interference light power caused by the wavelength change in the incident light is detected, so that an amount of change in the wavelength of the incident light can be measured.

However, as shown in FIG. 24, at a point A on the wavelength, the power decreases in each of the case where the wavelength changes in the short wavelength direction and the case where the wavelength changes in the long wavelength direction.

On the contrary, at a point B on the wavelength, the power increases in each of the case where the wavelength changes in the short wavelength direction and the case where the wavelength changes in the long wavelength direction.

As a result, according to the attempt for the improvement described above, when detecting the power change in the interference beam, associating with the wavelength change of the incident light, it is impossible to know in which direction the wavelength is changed to increase or decrease the wavelength. This poses a problem that the amount of wavelength change in the incident light cannot be measured accurately.

BRIEF SUMMARY OF THE INVENTION

The present invention has been made in consideration to the problems described above, and it is therefore an object of the present invention to provide a light wavelength measuring apparatus capable of performing a quick measurement of the wavelength of the subject light, by using a two-beam interferometer which does not require the movement of the movable mirror when measuring the amount wavelength change of the incident light, is capable of properly measuring the amount of wavelength change of the incident light through real-time measurement of how much and in which of the increasing or decreasing directions the wavelength has changed.

Another object of the present invention is to provide a light wavelength measuring apparatus and a method therefor, capable of solving various problems in the course of achieving the above object.

In order to achieve the above objects, according to a first aspect of the present invention, there is provided a light wavelength measuring apparatus comprising:

a two-beam interferometer which splits an incident light in two optical paths, combines and outputs split lights together again, the two-beam interferometer being configured to generate at least one or more combined light made from two beams having polarization states different from each other;

a polarization state detector which detects a variation in the polarization state of the combined light generated by the two-beam interferometer; and an electric circuit which calculates a wavelength of the incident light based on the variation in the polarization state of the combined light detected by the polarization state detector, wherein a difference in length between the two optical paths of the two-beam interferometer of a point of splitting the incident light and a point of combining the split lights is fixed, for a detection of polarization variation in the combined light according to a wavelength variation of the incident light by the polarization state detector.

Further, according to a second aspect of the present invention, there is provided the light wavelength measuring apparatus according to the first aspect, wherein at least one of the two optical paths in the two-beam interferometer, from the point of splitting the incident light to the point of combining the split lights, is provided with an optical element which transforms the incident light into a different polarization state.

Further, according to a third aspect of the present invention, there is provided the light wavelength measuring apparatus according to the first aspect, wherein the two-beam interferometer uses a polarization beam splitter as a beam splitter/combiner which splits the incident light into two, combines and outputs the split lights together again.

Further, according to a fourth aspect of the present invention, there is provided the light wavelength measuring apparatus according to the first aspect, wherein a plurality of optical components used in the two-beam interferometer are disposed in tight abutment together on the optical paths in the two-beam interferometer, from the point of splitting the incident light to the point of combining the split lights, a temperature adjusting mechanism being provided for maintaining the optical components at a constant temperature.

Further, according to a fifth aspect of the present invention, there is provided the light wavelength measuring apparatus according to the first aspect, wherein the two-beam interferometer is supplied with a reference light which has a stabilized wavelength, in generally the same optical path as for the subject light, generally simultaneously with the subject light;

the polarization state detector detects a polarization state for each of the combined light of the subject light coming out of the two-beam interferometer and the combined light of the reference light;

a correction is made to an amount of variation in the optical path length included in the polarization state of the subject light, based on the polarization state of the combined light of the subject light and the combined light of the reference light detected by the polarization state detector.

Further, according to a sixth aspect of the present invention, there is provided the light wavelength measuring apparatus according to the fifth aspect, wherein the two-beam interferometer comprises an actuator which slightly varies the length of at least one of the optical paths, the actuator is subjected to a feedback control based on the polarization or an interference light component, of one of the combined light of the subject light and the combined light of the reference light coming out of the two-beam interferometer.

Further, according to a seventh aspect of the present invention, there is provided the light wavelength measuring apparatus according to the sixth aspect, further comprises a light absorbing cell which absorbs a light of a specific wavelength, and a reference wavelength light source which outputs as the reference light a beam whose wavelength is locked to the specific wavelength absorbed by the light absorption cell.

Further, according to an eighth aspect of the present invention, there is provided the light wavelength measuring apparatus according to the seventh aspect, wherein the light from the reference wavelength light source is frequency-modulated at a predetermined modulation frequency while being locked at the specific wavelength, frequency response of a circuit to drive the actuator which provides a variable control on the optical path length is set to a frequency sufficiently lower than the predetermined modulation frequency.

Further, according to a ninth aspect of the present invention, there is provided the light wavelength measuring apparatus according to the seventh aspect, further comprising a photo detector which detects a light coming out of the absorption cell, and a trigger generation circuit which generates a trigger when an output signal from the photo detector or a differential signal of the output signal is identical with a specific level, wherein the electric circuit outputs a wavelength of the subject light, in synchronization with the trigger generated by the trigger generation circuit.

Further, according to a tenth aspect of the present invention, there is provided the light wavelength measuring apparatus according to the first aspect, wherein the two-beam interferometer comprises an optical path varying mechanism which varies the length of at least one of the two optical paths, the polarization state detector detects a first amount of variation in the polarization state of the combined light caused when the optical path length varying mechanism varies the optical path length by a predetermined distance, for a detection of an absolute value of wavelength of the incident light, and a second amount of variation in the polarization state of the combined light caused by a wavelength variation in the subject light when the optical path length is fixed, for a detection of polarization condition according to a wavelength variation of the incident light, the electric circuit performs real-time measurement of an absolute wavelength of the subject light, based on the first and second amounts of variation detected by the polarization state detector.

Further, according to an eleventh aspect of the present invention, there is provided the light wavelength measuring apparatus according to the first aspect, wherein the two-beam interferometer has a light entering portion provided with a double-image polarizing element which separates the incident light into lights of first and second polarization components which are perpendicular to each other.

Further, according to a twelfth aspect of the present invention, there is provided a light wavelength measuring method comprising:

preparing a two-beam interferometer which splits an incident light in two optical paths, combines and outputs the split lights together again, the two-beam interferometer generating at least one combined light made from two beams having polarization states different from each other;

detecting a first amount of variation in the polarization state of the combined light caused by the variation in the optical path length by the predetermined distance;

detecting a second amount of variation in the polarization state of the combined light caused by a wavelength variation in the subject light when an optical path length of at least one of the two optical paths in the two-beam interferometer is fixed;

varying an optical path length of at least one of the two optical paths in the two-beam interferometer, by a predetermined distance; and performing a real-time calculation of a wavelength of the incident light based on the first and the second amounts of variation.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiment of the invention, and together with the general description given above and the detailed description of the embodiment given below, serve to explain the principles of the invention.

FIG. 22A is a diagram showing a configuration a major portion of a light wavelength measuring apparatus in the prior art;

FIGS. 22B and 22C are diagrams showing waveforms of a combined subject light and a combined reference light respectively in the light wavelength measuring apparatus in the prior art;

DETAILED DESCRIPTION OF THE INVENTION

Figure 1:
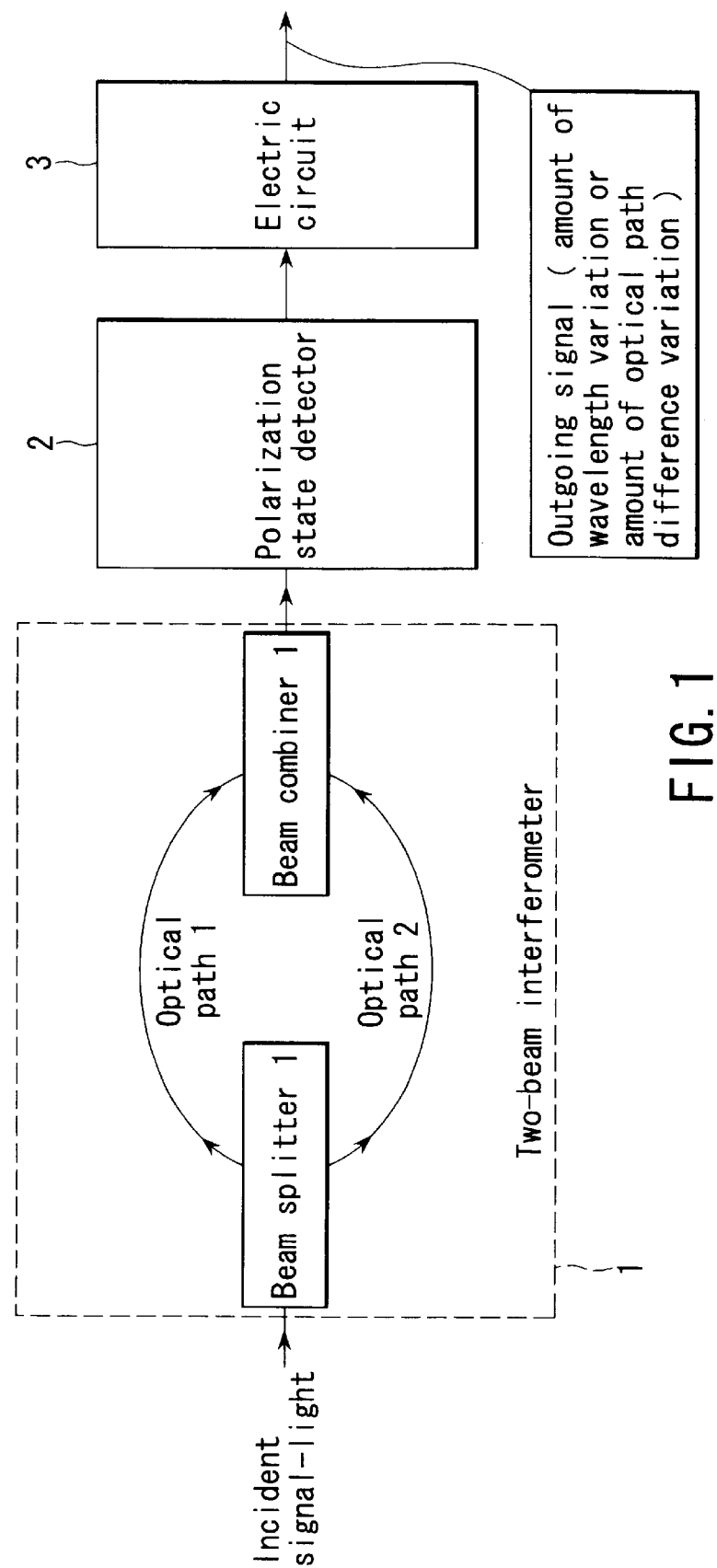
FIG. 1 is a block diagram showing a configuration of a light wavelength measuring apparatus according to a first aspect of the present invention.

Reference will now be made in detail to the presently preferred embodiments of the invention as illustrated in the accompanying drawings, in which like reference numerals designate like or corresponding parts.

FIG. 1 is a block diagram showing a configuration of a light wavelength measuring apparatus according to a first aspect of the present invention.

As shown in FIG. 1, the light wavelength measuring apparatus according to the first aspect of the present invention mainly comprises a two-beam interferometer 1, a polarization state detector 2 and an electric circuit 3.

The two-beam interferometer 1 receives a subject light as an incident light, splits the incident light is into two beams, and then combining the beams again, thereby obtaining an interference signal.

The polarization state detector 2 converts a polarization state of the interference light coming from the two-beam interferometer 1 into an electric signal and outputs the converted signal.

The electric circuit 3 receives the above electric signal, converts it into a wavelength value of the incident light, and outputs the obtained value.

According to the above beam wavelength measuring apparatus, an optical path difference x is fixed and the wavelength of the subject light is calculated from the polarization state of the combined light.

Here, description will be made for the wavelength change in the incident light and change of the polarization state in the combined light, using an example of a Michelson interferometer. The Michelson interferometer is utilized as a two-beam interferometer in conventional light wavelength measuring apparatuses.

Figure 2:
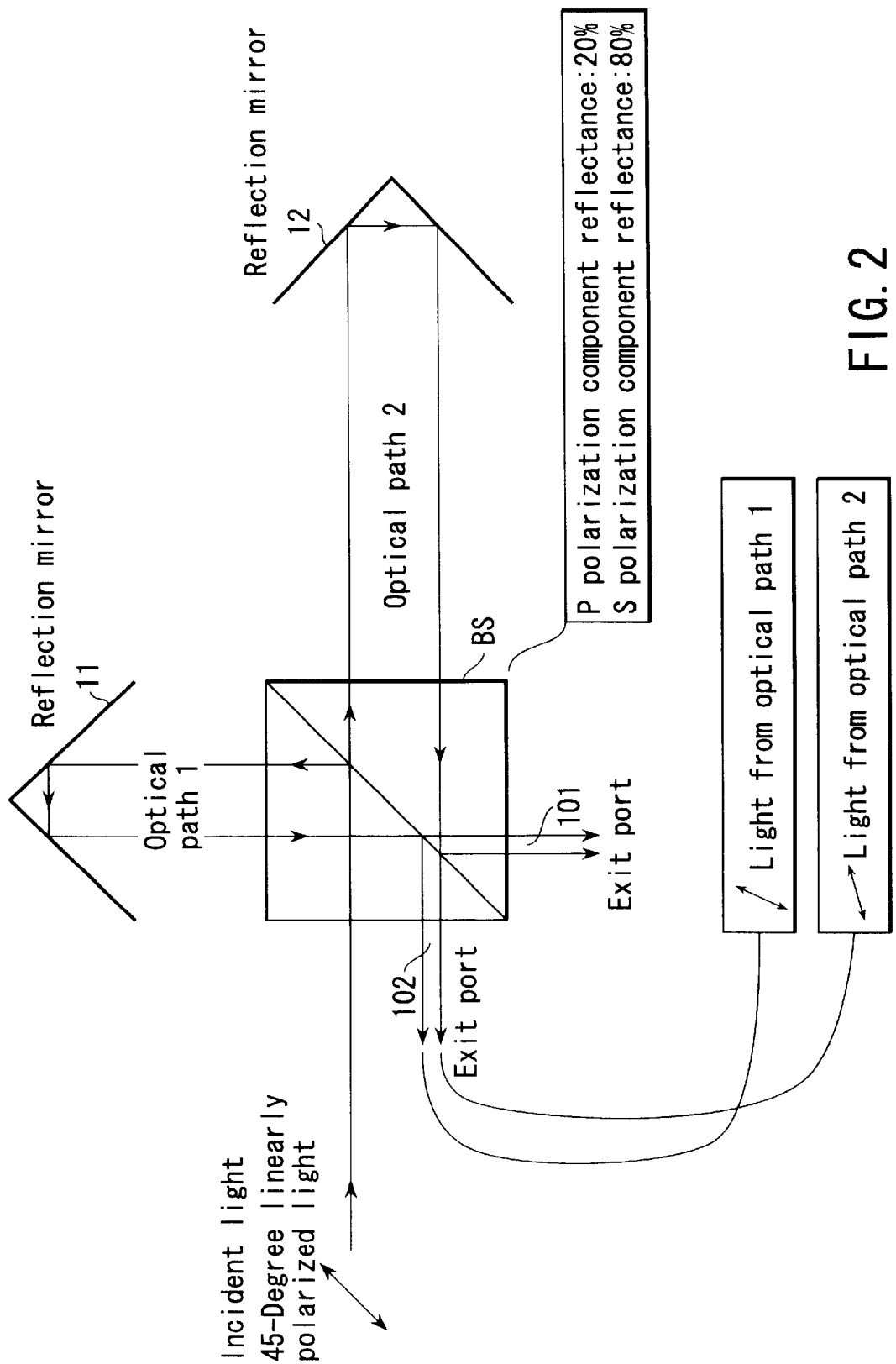
FIG. 2 is a diagram showing a polarization state of a combined light incident from a Michelson interferometer used as a two-beam interferometer in FIG. 1.

FIG. 2 shows a principle configuration of the Michelson interferometer.

An incident light introduced into a beam splitter BS is split in a path 1 and a path 2 respectively, reflected by a reflection mirror 11 and a reflection mirror 12 respectively, and then introduced again into the beam splitter BS, where the two beams are combined into one.

The beam splitter BS generally has a polarization characteristic. Thus, here in this example, the beam splitter is assumed to have a reflectance of 20% in a P polarization component, and a reflectance of 80% in an S polarization component. It is also assumed that the incident light is a linearly polarized light of an azimuth angle of 45 degrees.

Further, for simplicity of the description, it is further assumed that an amount of phase variation associating with the reflection and transmission is the same in both of the P and S polarization components, and there is no loss.

In the above optical system, description will be made with an attention to the beam coming out of an exit port 102.

First, consideration is made to a polarization state of the light from the path 1 after two times of reflections in the beam splitter BS.

This light has the P polarization component which is 4% of the power of the incident light, and the S polarization component which is 64% of the power of the incident light.

Since there is no phase difference between the two polarization components and since the incident light is a 45-degree linearly polarized light, the polarization state of the light is 76-degree linear polarization.

Next, consideration is made to a polarization state of the beam from the path 2 after two times of transmissions to the beam splitter BS.

In this beam, contrary to the beam described above, the P polarization component is 64%, and the S polarization component is 4%, and therefore the polarization state of the light is 14-degree linear polarization.

Further, since the beam is a 45-degree linearly polarized light, each of the lights from the path 1 and the path 2 has the same power as each other.

The polarization state of a beam as a combination of these two linearly polarized lights varies depending on a phase difference $\Delta\theta$ (which is the phase difference common in the P and S polarization components, and is defined as $\Delta\theta =$ phase of light from the path 1 minus phase of light from path 2).

For example, if the phase difference $\Delta\theta$ between the two beams is 0, the incident light returns to the original polarization state of the 45-degree azimuth.

If the phase difference $\Delta\theta$ is 90 degrees, the incident light becomes a right-hand elliptically polarized light, at the elliptic angle of 31 degrees and the azimuth angle of 45 degrees.

The polarization state of the combined light can be expressed using Stokes' parameter S={I Q U V} as the following expression (1):

$$\frac{Iin}{25}\begin{bmatrix} 17 + 8\cos\Delta\theta \\ 0 \\ 8 + 17\cos\Delta\theta \\ 15\sin\Delta\theta \end{bmatrix} \quad (1)$$

In the above Expression (1), Iin represents the power of the subject light in the 45-degree linearly polarized light.

Figure 3:
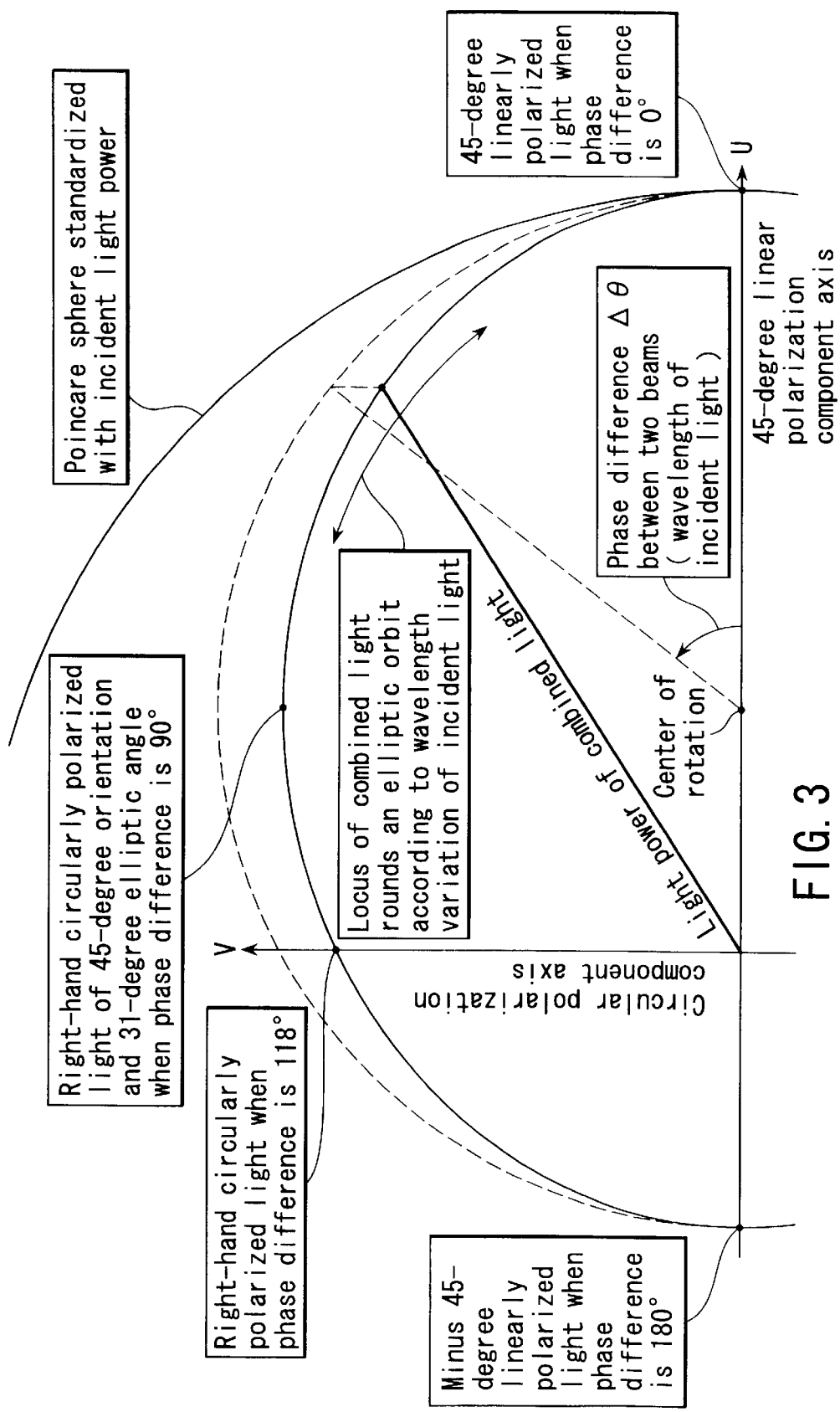
FIG. 3 is a diagram showing a relationship between a phase difference and a polarization state of a combined light incident from an exit port 2 of the Michelson interferometer in FIG. 2.

FIG. 3 shows a relationship between the phase difference $\Delta\theta$ and the polarization state of the combined light.

As understood from Expression (1) and FIG. 3, as the phase difference $\Delta\theta$ varies, the polarization state of the combined light varies along an elliptic orbit on the UV plane, with the power of the combined light (the distance from the point of origin) varying also with the variation in the phase difference $\Delta\theta$.

The phase difference $\Delta\theta$ between the two beams results from a difference in the length of optical paths in the two-beam interferometer. Therefore, the following relationship applies:

$$\Delta\theta = 2\pi(n \cdot x)/\lambda \quad (2)$$

As understood from the above Expression (2), the phase difference $\Delta\theta$ is a function of the wavelength $\lambda$ of the incident light.

In other words, the phase difference $\Delta\theta$ of the two lights varies in accordance with the Expression (2) as the wavelength $\lambda$ of the incident light varies.

When the phase difference $\Delta\theta$ of the two beams varies, the polarization state of the combined light outputted from the exit port 102 of the Michelson interferometer varies on an elliptic orbit on the UV plane.

A note should be made here for the combined light coming out of the exit port 101 of the Michelson interferometer in FIG. 2. Since both of the lights from the path 1 and the path 2 are in the same polarization state (45-degree linear polarization), the polarization state of the combined light does not vary with wavelength change of the incident light, although there are changes in their power.

Next, description will be made for a general case.

Specifically, description will take an example of a combined light made from two arbitrary beams in polarization states different from each other, and consideration will be made to the variation in the phase difference Δθ and to the polarization state.

First, the two arbitrary beams in polarization states different from each other are named Beam 1 and Beam 2, and their respective Stokes' parameters are defined as S1={I1 Q1 U1 V1} and S2={I2 Q2 U2 V2} respectively. Likewise, their unit vectors standardized with the I component are defined as Vector k1={Q1/I1 U1/I1 V1/I1} and Vector k2{Q2/I1 U2/I2 V2/I2} respectively With the above, calculation is made for a case in which an absolute value of vector K1+vector k2≠0 (in which the two lights are not perpendicular to each other). The calculation uses the following matrix R given by Expression (4) which uses three mutually perpendicular unit vectors given by Expression (3) as matrix components. The calculation gives Expression (5) as Stokes' parameter S12={I12 Q12 U12 V12}.

$$\begin{cases} \vec{kq} = (\vec{k_1}+\vec{k_2})/|\vec{k_1}+\vec{k_2}| \\ \vec{kv} = (\vec{k_2}-\vec{k_1})/|\vec{k_2}-\vec{k_1}| \\ \vec{ku} = \vec{kv} \times \vec{kq} \end{cases} \quad (3)$$

$$R = [\vec{kq}\ \vec{ku}\ \vec{kv}] \quad (4)$$

$$\begin{cases} I_{12} = I_1 + 2\sqrt{I_1 I_2}\ \cos\Delta\beta\cos\Delta\theta + I_2 \\ \begin{bmatrix} Q_{12} \\ U_{12} \\ V_{12} \end{bmatrix} = R \begin{bmatrix} (I_1+I_2)\cos\Delta\beta + 2\sqrt{I_1 I_2}\ \cos\Delta\theta \\ 2\sqrt{I_1 I_2}\ \sin\Delta\beta\sin\Delta\theta \\ (-I_1+I_2)\sin\Delta\beta \end{bmatrix} \end{cases} \quad (5)$$

In the above, Δβ in Expression (5) represents an angle made by Vector kq and Vector k1 (or Vector k2), and this takes a value that satisfies 0<Δβ≦π/2.

On the other hand, if the polarization in a light 1 and polarization of a light 2 are perpendicular to each other, an arbitrary unit vector which is perpendicular to Vector kv can be defined as kq, so that Expression (5) becomes applicable.

The matrix R is a rotational transformation around the point of origin.

Δβ and the matrix R are constants (or a matrix containing constants as its components) determined by the two-beam interferometer and the polarization state of incident light.

As understood from Expression (5), when two arbitrary beams in polarization states different from each other are combined into one beam, its polarization varies along an elliptic locus on a plane in the {Q U V} space, as the phase difference Δθ varies.

Figure 4A:
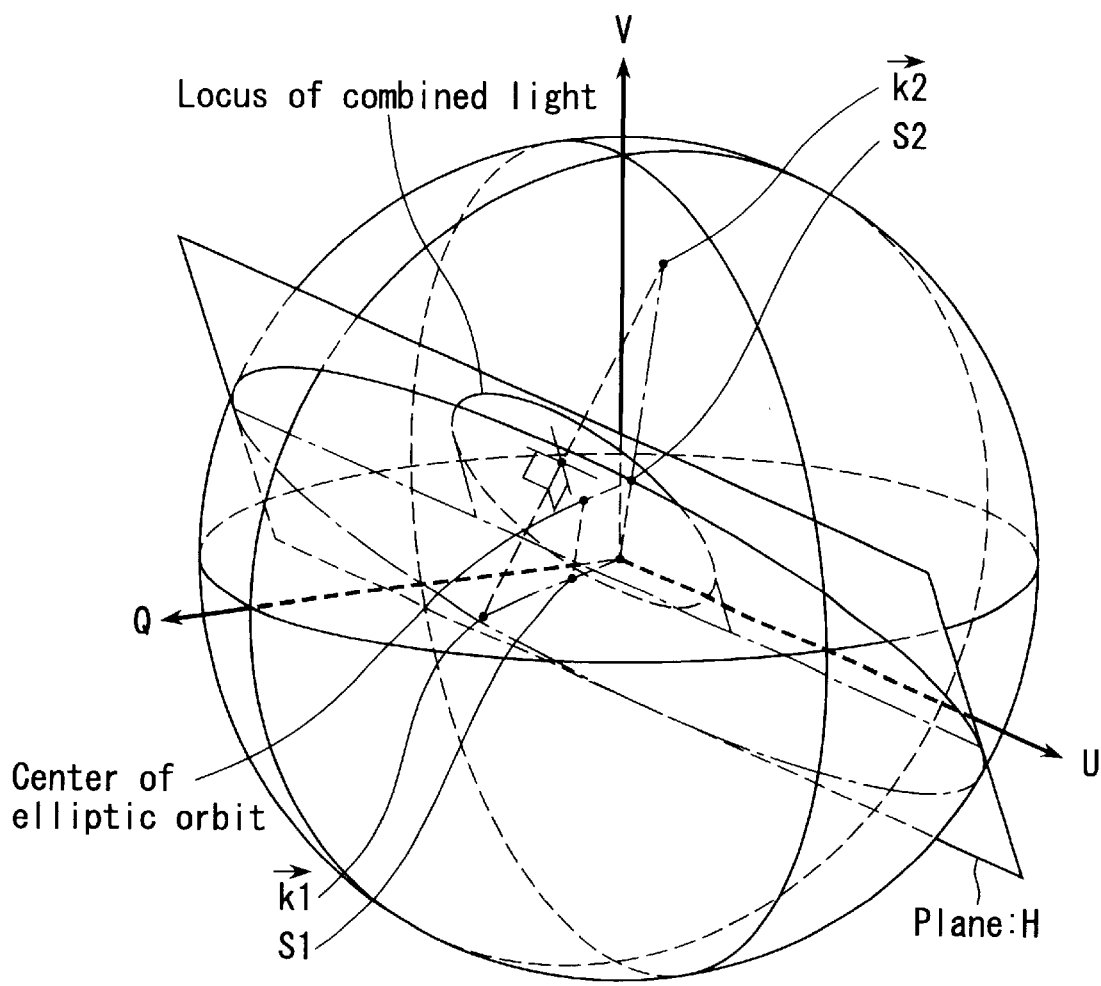
FIG. 4A is a diagram showing a relationship between a phase difference and a polarization state of a combined light made from two arbitrary beams whose polarization states are different from each other.
Figure 4B:
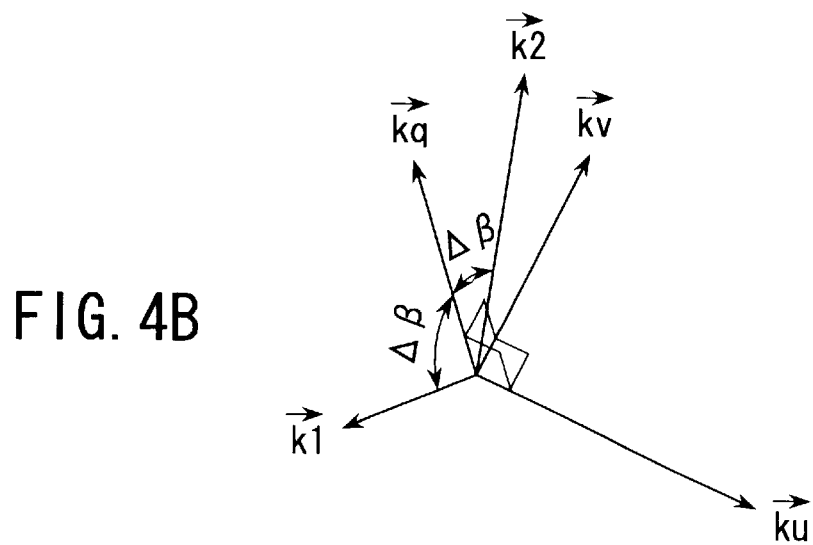
FIG. 4B is a diagram showing a relationship between respective vectors in Expression (3)

FIG. 4A and FIG. 4B show the above variation.

FIG. 4B shows a relationship among Vector k1, Vector k2, Vector kq, Vector ku, and Vector kv.

FIG. 4A shows relationship among S1, S2 and the elliptic locus of the combined light S12, in association with the variation in the phase difference Δθ.

The ellipse has its center at a point of sum between Vectors S1 and S2, and the ellipse orbit exists on a plane H which passes this point and is perpendicular to Vector kv.

The major axis of the ellipse is in parallel to Vector kq, with an amplitude of 2 (I1·I2)1/2.

The minor axis of the ellipse is in parallel to Vector ku, with an amplitude of 2 (I1·I2)1/2 sin Δθ.

As has been described above, a combined light made from two arbitrary beams in polarization states different from the other varies along an elliptic locus on a plane in the {Q U V} space, as the phase difference Δθ varies.

Next, when considering a case in which a common two-beam interferometer is used, it is understood that "a combined light made from two beams in polarization states different from each other" can be obtained easily.

The present invention achieves the measurement of the amount of wavelength change in the incident light, on the basis of the above-described principle.

Specifically, a combined light made from two lights in polarization states different from each other is obtained from the two-beam interferometer. The polarization of the outputted beam is detected by the polarization state detector 2, and an angle on the elliptic orbit is converted into an electric signal.

The electric circuit 3 integrates the given electric signal, obtains a total phase difference from an original phase difference, and applies the value into Expression (2), thereby converting the value into a wavelength of the subject light.

In this way, according to the present invention, without moving the movable mirror as has to be in the conventional light wavelength measuring apparatus, it is made possible to perform a real-time measurement of the amount of change in the wavelength and the direction of the change.

Next, description will be made for a specific configuration of the light wavelength measuring apparatus according to the first aspect of the present invention shown in FIG. 1.

Figure 5:
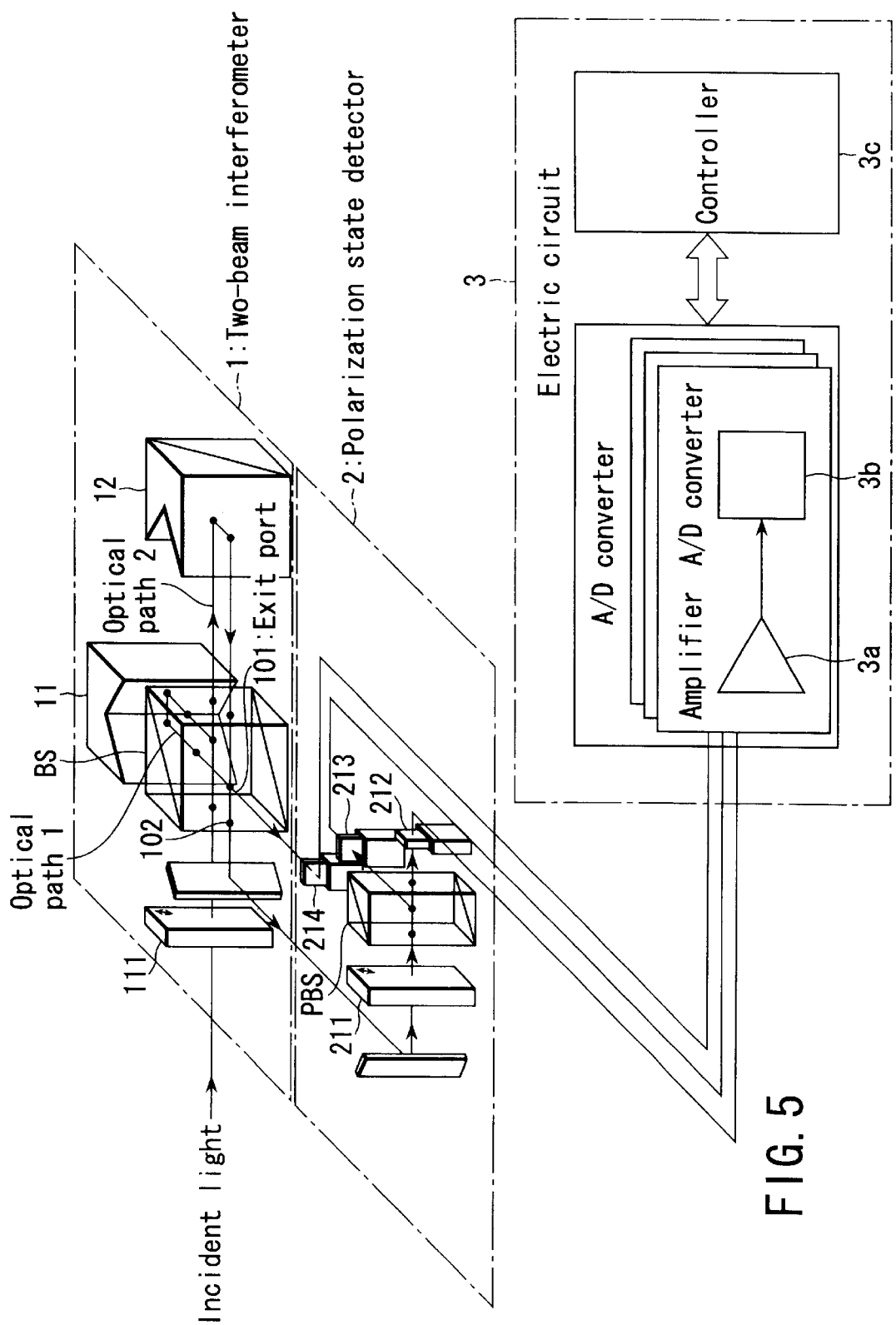
FIG. 5 is a block diagram showing a configuration of a light wavelength measuring apparatus according to a first embodiment of the present invention.

FIG. 5 shows the specific configuration of the light wavelength measuring apparatus according to the first embodiment of the present invention.

A Michelson interferometer (FIG. 2) is used as the two-beam interferometer 1.

The Michelson interferometer has its beam entrance portion provided with an analyser 111 at an azimuth angle of 45 degrees, which transforms the subject light into a 45-degree linearly polarized light.

The two-beam interferometer 1 splits the beam and combines the two beams into one, which are then entered to the polarization state detector 2.

The polarization state detector 2 is not necessarily be a complete Stokes' analyser, and according to the present embodiment, mainly includes a quarter-wavelength plate 211, a polarization beam splitter PBS, and three light receivers 212, 213, and 214.

The Stokes' analyser may be provided by an apparatus and method disclosed in Jpn. Pat. Appln. KOKAI Publication No. 6-18332, for example.

A combined light that comes out of the exit port 102 of the two-beam interferometer 1 has its polarization altered by the quarter-wavelength plate 211 in the polarization state detector 2.

The quarter-wavelength plate 211 is disposed at an azimuth angle of 45 degrees. The incident light receives a 90-degree rotation around Axis U (in a direction in which Axis Q is rotated toward Axis V) on the Poincare sphere.

As a result, the beam coming out of the quarter-wavelength plate 211 has its Stokes' parameter given by the following Expression (6), and is transformed onto an elliptic orbit on the QU plane.

$$\frac{Iin}{25}\begin{bmatrix} 17+8\cos\Delta\theta \\ -15\sin\Delta\theta \\ 8+17\cos\Delta\theta \\ 0 \end{bmatrix} \qquad (6)$$

This beam is split by the polarization beam splitter BS into a linearly polarized horizontal component and a linearly polarized vertical component, then converted into electric signals by the light receiver 212 and the light receiver 213 respectively, before being outputted to the electric circuit 3.

On the other hand, the beam coming out of the exit port 101 of the two-beam interferometer 1 is converted into an electric signal by the light receiver 214 in the polarization state detector 2 and inputted to the electric circuit 3.

In the electric circuit 3, the electric signals inputted from the polarization state detector 2 is passed through an amplifier 3a, in which the signals are converted into digital signals by an analog/digital converter 3b. The converted signals are read by a controller 3c.

With the above, incident light powers received by the light receiver 212 and the light receiver 213 are represented by Ia and Ib respectively. Then, the following Expression (7) is obtained:

$$\begin{cases} Ia = \dfrac{Iin}{50} \cdot (8 \cdot \cos\Delta\theta - 15 \cdot \sin\Delta\theta + 17) \\ Ib = \dfrac{Iin}{50} \cdot (8 \cdot \cos\Delta\theta + 15 \cdot \sin\Delta\theta + 17) \end{cases} \qquad (7)$$

Also, power of light entering the light receiver 214 is represented by Ic. Then, from the energy conservation law, the following expression Ia+Ib+Ic=Iin is true, and this can also be expressed in the following matrix Expressions (8) and (9):

$$M\begin{bmatrix} \cos\Delta\theta \\ \sin\Delta\theta \end{bmatrix} = Ix - Io \qquad (8)$$

$$\begin{cases} M = \dfrac{1}{50}\begin{bmatrix} 8 & -15 \\ 8 & 15 \end{bmatrix} \\ Io = \dfrac{1}{50}\begin{bmatrix} 17 \\ 17 \end{bmatrix} \\ Ix = \dfrac{1}{Ia+Ib+Ic}\begin{bmatrix} Ia \\ Ib \end{bmatrix} \end{cases} \qquad (9)$$

In this case an inverse matrix exists for the matrix M, and therefore, the following Expression (10) is given as a solution:

$$\begin{bmatrix} \cos\Delta\theta \\ \sin\Delta\theta \end{bmatrix} = M^{-1}\{Ix - Io\} \qquad (10)$$

$$= \dfrac{1}{24 \cdot (Ia+Ib+Ic)}\begin{bmatrix} 3 \cdot (8 \cdot Ia + 8 \cdot Ib - 17 \cdot Ic) \\ 40 \cdot (Ia - Ib) \end{bmatrix}$$

The controller 3c in the electric circuit 3 obtains Ia, Ib and Ic from the electric signals sent from the light receiver 212, the light receiver 213 and the light receiver 214, and performs concomitant calculation of a decimal portion of the $\Delta\theta/2\pi$ using Expression (10) and the inversed tangential function ($\tan^{-1}$)

The integer portion of the $\Delta\theta/2\pi$ is selected from values stored in advance as initial values in the controller. (Alternatively, an initial wavelength $\lambda$ ini of the subject light inputted by the user is applied to the following expression $\lambda$ ini/($2\pi \cdot n \cdot x$), and an integer portion of the obtained initial phase difference is used.)

With the above, the controller 3c in the electric circuit 3 adds one to or subtracts one from the integer portion, in accordance with an overflow or an underflow of the decimal portion caused by the wavelength change in the incident light. Thereupon, the phase difference is integrated.

The integer portion is added to the decimal portion and a total phase difference $\Delta\theta$ is calculated concomitantly.

Finally, the controller 3c in the electric circuit 3 calculates the wavelength of the subject light from the following expression and the calculated wavelength is outputted:

$$\lambda = 2\pi(n \cdot x/\Delta\theta) \qquad (11)$$

It should be noted that the refractive index n and the optical path difference x are stored as known values in the controller.

The data reading, calculations and outputting of the results by the controller 3c are completed in a very short time.

As has been described above, according to the light wavelength measuring apparatus offered by the first embodiment shown in FIG. 5, it becomes possible to make a real-time measurement of the wavelength of the subject light.

It should be noted that the two-beam interferometer 1 may not necessarily be provided by the Michelson interferometer shown in FIG. 2, but alternatively be provided by a Mach-Zehnder interferometer for example, or any other two-beam interferometer.

In such a variation, it is only necessary to satisfy the above mentioned condition, that is, "At least one out-coming light is a combined light obtained by combining two beams in polarization states different from each other."

Further, the polarization state detector 2 may not necessarily have the configuration shown in FIG. 5.

For example, the phase difference of the wavelength plate is not necessarily be $\lambda/4$. Likewise, the azimuth angle may not necessarily be 45 degrees.

Further, the polarization beam splitter PBS may not necessarily be provided at the 0-degree azimuth, but may be at another angle.

Figure 6:
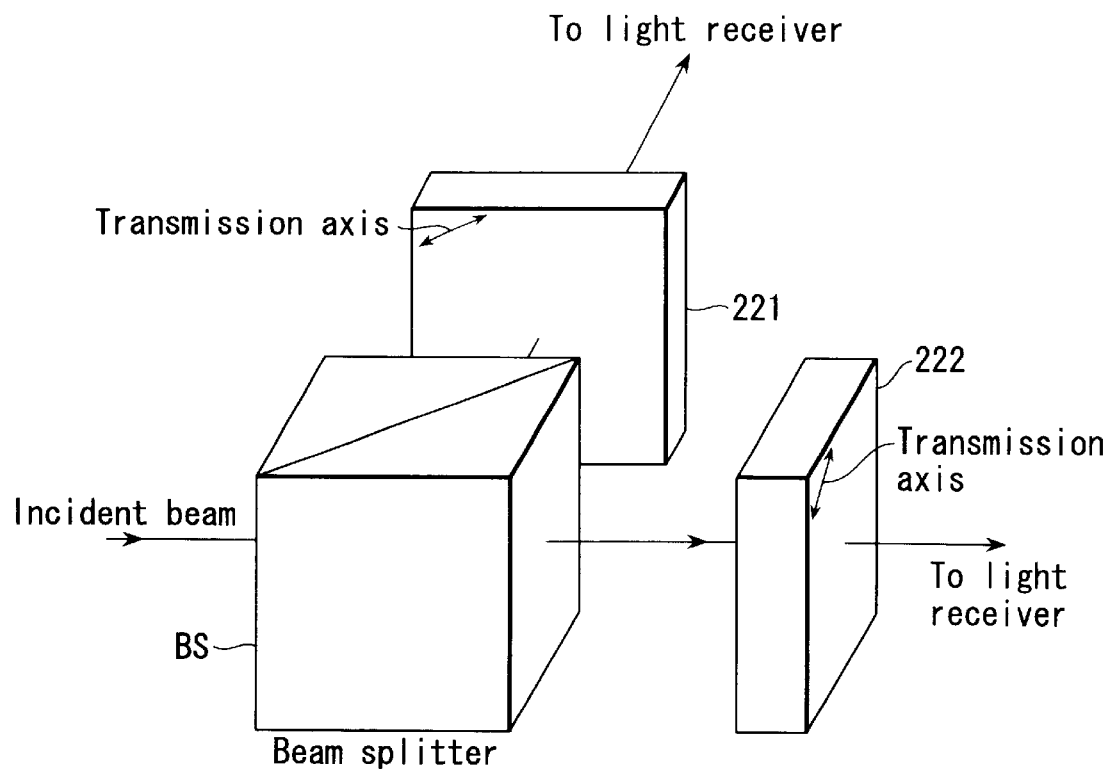
FIG. 6 is a diagram showing another configuration of a polarization state detector 2 in FIG. 5.

Further, the polarization beam splitter PBS may not necessarily be used. For example, as shown in FIG. 6, an inexpensive beam splitter BS may be used for splitting the beam into two, and then two optical analyzers 221 and 222 disposed at a different orientation from each other may be used for measuring optical powers in the different polarization directions.

When configuring the polarization state detector a condition must be satisfied that in Expression (8) for the calculation of $\Delta\theta$, there should be an inverted matrix with respect to the matrix R.

Further, if the polarization state detector 2 is provided by the Stokes' analyser, it becomes possible to use any two-beam interferometer that satisfies the above condition.

Specifically, when the Stokes' parameter S12={I12 Q12 U12 V12} obtained by the strokes analyzer is applied to Expression (5), the following Expression (12) is obtained, in which matrix R and $\Delta\beta$ are each known value which is unique to the two-beam interferometer. Therefore, from Expression (12), the phase difference $\Delta\theta$ can be calculated:

$$\begin{cases} \begin{bmatrix} \cos\Delta\theta \\ \cos\Delta\theta \end{bmatrix} = \frac{1}{2\sqrt{I_1 I_2}} \begin{bmatrix} u_{12}/\sin\Delta\beta \\ q_{12} - (I_1 + I_2)\cos\Delta\beta \end{bmatrix} \\ \begin{bmatrix} I_1 \\ I_2 \end{bmatrix} = \frac{1}{2\sin^2\Delta\beta} \begin{bmatrix} I_{12} - q_{12}\cos\Delta\beta - v_{12}\sin\Delta\beta \\ I_{12} - q_{12}\cos\Delta\beta + v_{12}\sin\Delta\beta \end{bmatrix} \\ \begin{bmatrix} q_{12} \\ u_{12} \\ v_{12} \end{bmatrix} = R^{-1} \begin{bmatrix} Q_{12} \\ U_{12} \\ V_{12} \end{bmatrix} \end{cases} \quad (12)$$

Next, description will be made for a light wavelength measuring apparatus according to a second aspect of the present invention.

According to the light wavelength measuring apparatus offered by the first aspect of the present invention, a polarization characteristic of an optical component used in the two-beam interferometer is utilized. This sometimes makes an accurate measurement impossible, depending on the wavelength of the subject light.

Specifically, measuring error is large if the value of $\Delta\beta$ in Expression (12) is close to 0, or if a combined wave power ratio=|(I1−I2)/(I1+I2)|takes a small absolute value.

According to the light wavelength measuring apparatus offered by the second aspect of the present invention to be described below, in order to solve the above problem, at least in one of the two optical paths in the two-beam interferometer, from the beam splitting to the combining, there is interposed an optical element which transforms the incident light into a different polarization state. With this arrangement, it becomes possible to intentionally differentiate the polarization of the two beams, and therefore to maintain a high accuracy in the measured wavelength.

FIGS. 7A to 7E show examples of the two-beam interferometer which can be used in the light wavelength measuring apparatus according to the second aspect of the present invention.

Figure 7A:
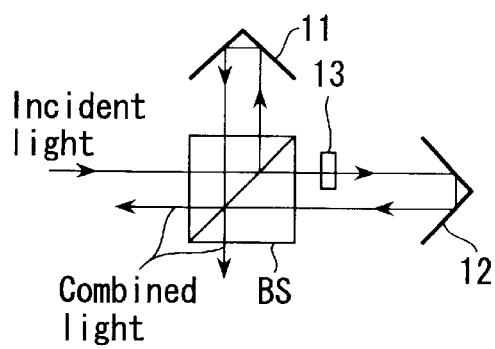
FIGS. 7A to 7E are diagrams showing examples of the two-beam interferometer according to a second aspect of the present invention, with FIGS. 7A to 7C showing examples in which a polarizer is provided by a wave plate, a polarizer, and a flat glass plate respectively, FIG. 7D showing a Mach-Zehnder interferometer including a combination of a coiled SM fiber and an optical coupler, and FIG. 7E showing a Mach-Zehnder interferometer including a combination of a polarization-maintaining optical fiber and an optical coupler.
Figure 7B:
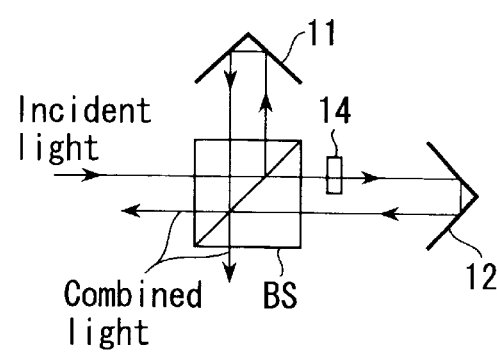
Figure 7C:
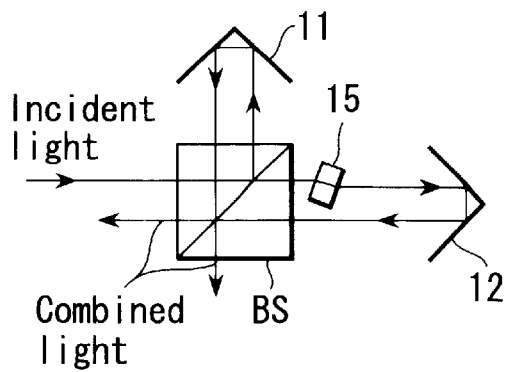

FIGS. 7A to 7C show examples of the two-beam interferometer in which the optical element that transforms the incident light into a different polarization state is provided by a wave plate 13, a polarizer 14, and a slanted flat glass plate 15 respectively.

As shown in these examples, whatever optical element may be used as long as the polarization state of the combined light is made different from each other.

Figure 7D:
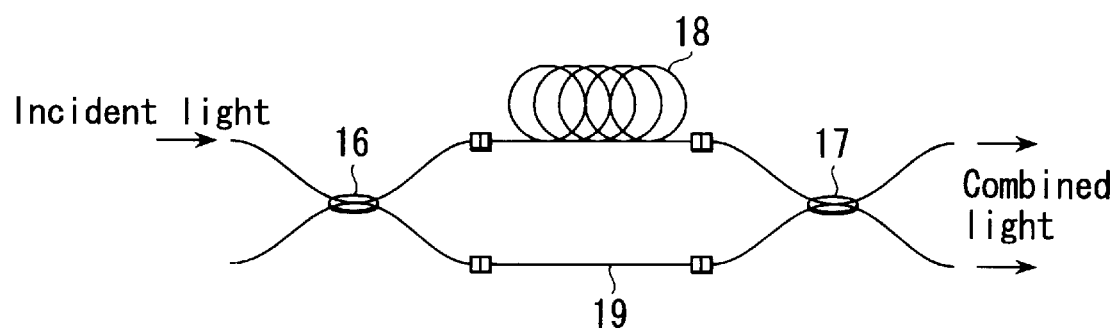
Figure 7E:
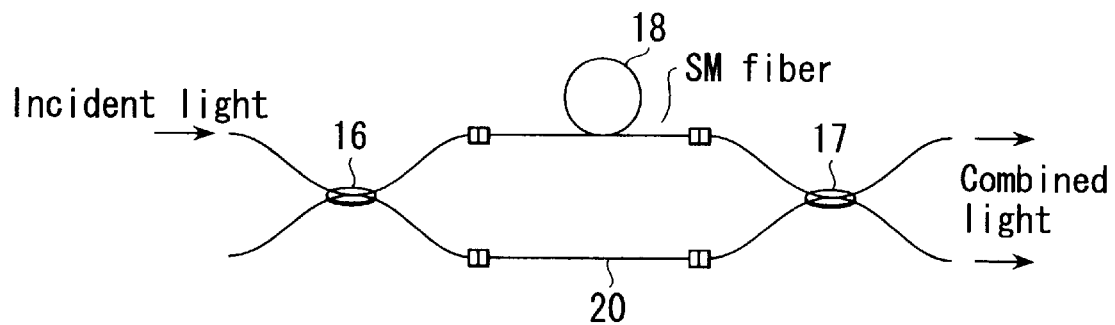

FIGS. 7D and 7E show Mach-Zehnder interferometers including optical couplers 16 and 17.

The example shown in FIG. 7D uses an SM fiber 18 wound into a coil. A stress developed in the fiber core alters the polarization state.

The example shown in FIG. 7E uses a polarization-maintaining optical fiber 20 in one of the optical paths, for the differentiation of the polarization state.

Next, description will be made for a light wavelength measuring apparatus according to a third aspect of the present invention.

In order to use the light power in the subject light efficiently and to achieve the highest accuracy in the measuring, the $\Delta\beta$ should be 90 degrees and the power ratio |(I1−I2)/(I1+I2)| should be 0.

According to the light wavelength measuring apparatuses offered by the first and the second aspects of the present invention, due to a wavelength characteristic of the optical element, it is difficult to maintain the above conditions over a wide range of wavelength.

Figure 8:
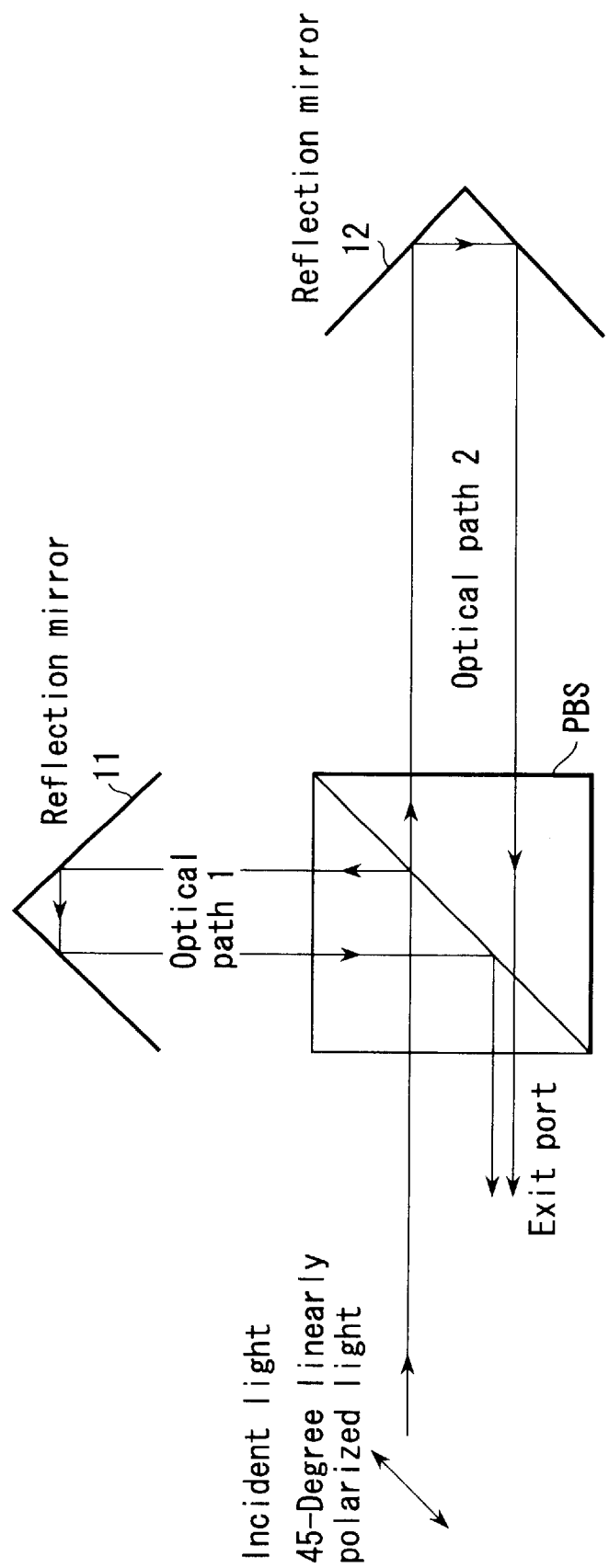
FIG. 8 is a diagram showing another example of a two-beam interferometer according to a third aspect of the present invention.

Thus, according to the light wavelength measuring apparatus offered by the third aspect of the present invention, in order to solve the above problem, as shown in FIG. 8, the two-beam interferometer 1 makes use of a polarization beam splitter PBS as a beam combiner/splitter. The polarization beam splitter PBS maintains the polarization characteristics over a wide range of wavelength.

As shown in FIG. 8, the subject light of the 45-degree linear polarization is split into linearly polarized, horizontal and vertical components of equal power, and then combined again by the polarization beam splitter PBS.

Thus, there is only one combined light, and as the phase difference $\Delta\theta$ varies, the polarization state of the combined light changes cyclically on a circle drawn around a point of origin on the UV plane.

Expression (12) is replaced by the following Expression (13), becoming able to use all of the light power for the measurement. Therefore, highly accurate wavelength measurement over a wide range of wavelength can be achieved.

$$\begin{bmatrix} \cos\Delta\beta \\ \sin\Delta\beta \end{bmatrix} = \begin{bmatrix} U_{12}/Iin \\ V_{12}/Iin \end{bmatrix} \quad (13)$$

Next, description will be made for a light wavelength measuring apparatus according to a fourth aspect of the present invention.

According to the light wavelength measuring apparatuses offered by the first through third aspects of the present invention, there are still the following problems.

Specifically, as shown in Expression (2), the phase difference $\Delta\theta$ detected by the polarization state detector 2 is not only a function of the wavelength of the subject light but also a function of the refractive index n and the optical path length difference x between the two optical paths.

Therefore, a change in these values causes an error in the wavelength measurement.

Here below, influences to the wavelength measurement caused by the changes in the refractive index n and the optical path length difference x will be described under item (1) and (2)

(1) Influence of Atmospheric Pressure

If the optical path difference in the interferometer includes an air layer, a change in the atmospheric pressure influences the measurement.

As an example, a case will be taken in which space that provides the optical path difference is the atmospheric space.

The standard air (dry air including 0.03% carbon dioxide at 15° C. under the atmospheric pressure of one) has a refractive index of 1.0002735 with respect to a light whose wavelength is 1.30 μm (the value in the vacuum space). Therefore, the wavelength is increased by about 0.36 nm in the standard air.

With an atmospheric change of 0.1, there is a measuring error of about 10% of 0.36 nm, namely 0.036 nm.

The atmospheric change of 0.1 is very common in normal weather conditions.

(2) Influence of Temperature

If the space that provides the optical path difference is filled with a solid material such as glass, the atmospheric pressure change no longer influences the measurement.

However, there is no way for avoiding influence from thermal expansion of optical components.

For example, glass has a linear expansion coefficient, which is 8 to $10\times10^{-6}$ approx. Thus, 1° C. of temperature change results in an influence of approximately 8 to 10 ppm.

Thus, in the light wavelength measuring apparatus according to the fourth aspect of the present invention, the following arrangement is made. Specifically, the light wavelength measuring apparatus according to the first through third aspects of the present invention has its optical components disposed tightly with each other to allow in as little air as possible, and each optical component is maintained at a constant temperature.

Figure 9:
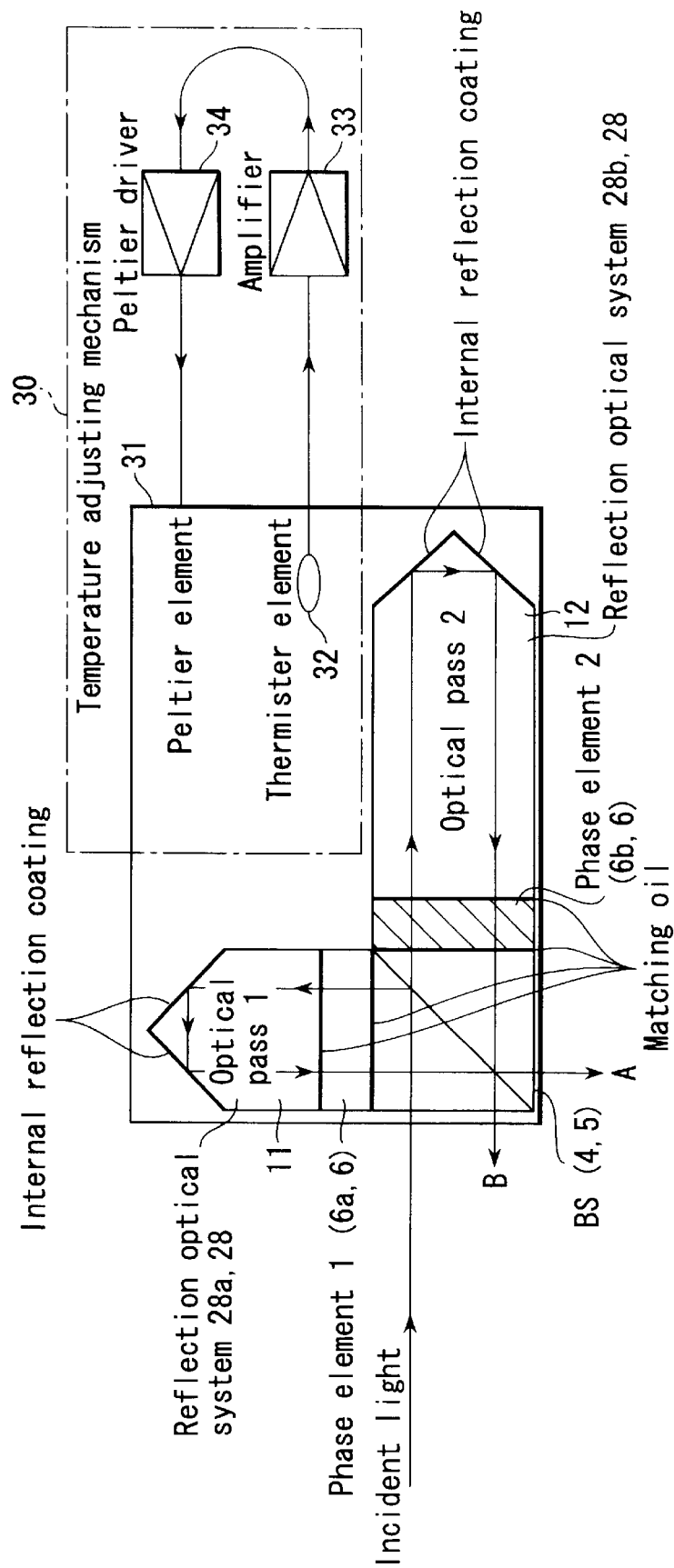
FIG. 9 is a diagram showing another example of a two-beam interferometer according to a fourth aspect of the present invention.

FIG. 9 shows a configuration of the light wavelength measuring apparatus according to the fourth aspect of the present invention.

According to this light wavelength measuring apparatus, there are spaces between the optical components; namely, spaces between the beam splitter BS which serves as a beam splitter 4 and a beam combiner 5 and respective phase elements 6 (6a, 6b), and spaces between the phase elements 6 (6b, 6b) and respective reflection optical systems 28 (28a, 28b) provided with a coating for internal reflection. Each space is filled with a matching oil (a grease which has the same refractive index as of the corresponding optical components), and all of the optical components are disposed in tight abutment so that the space which provides the optical path difference is entirely filled with a solid material such as glass.

This arrangement enables to prevent unnecessary reflection of light on surfaces in any of the optical components disposed in close abutment, and to reduce measuring error due to change in the refractive index of the air caused by the atmospheric pressure change.

Further, the light wavelength measuring apparatus shown in FIG. 9 is provided with a temperature adjusting mechanism 30 to maintain each optical component at a constant temperature.

The temperature adjusting mechanism 30 comprises a Peltier element 31, a thermistor 32, an amplifier 33, and a drive circuit 34.

With the above arrangement, all the optical components involved in the process from beam splitting to beam combining are disposed on a Peltier element 31. The temperature of these optical components are monitored through the thermistor 32, whose resister value varies in accordance with temperature change. The temperature is controlled by a feedback control. Specifically, based on a detection signal (more precisely, a signal as after amplification by the amplifier 33 at a predetermined magnitude of amplification) obtained in the monitoring, the drive circuit 34 controls electric current to feed to the Peltier element 31.

With the above arrangement, each optical component is maintained at a constant temperature, enabling to avoid the influence from the thermal expansion of the optical components.

A note should be made for the fourth aspect of the present invention. Specifically, as an alternative means for preventing change in the refractive index due to the atmospheric pressure change and so on, the two-beam interferometer may be entirely sealed in an airtight container.

However, in a two-beam interferometer serving for a purpose of highly accurate measurement in which a measuring error caused by the atmospheric pressure change poses a problem, it is necessary to provide a certain length of the optical path difference. This makes it unavoidable increase the size of the interferometer, making the airtight sealing technically difficult.

Another alternative for avoiding the alteration of the optical path difference due to the thermal expansion of optical components is to configure the two-beam interferometer with the optical components made of a material which has a small thermal expansion coefficient.

A problem, however, with this solution is that the optical components made of such a material are usually expensive, posing a cost problem.

Next, description will be made for light wavelength measuring apparatuses according to fifth and sixth aspects of the present invention. According to these apparatuses, use is made for different methods from those used in the light wavelength measuring apparatus according to the fourth aspect of the present invention, in order to solve the problem of wavelength measuring error due to the change in refractive index in the optical path of the two-beam interferometer and change in the optical path difference. These embodiments are characterized in that a reference light having a stabilized wavelength is inputted to the two-beam interferometer 1, together with the subject light.

First, description will be made for the light wavelength measuring apparatus according to the fifth aspect of the present invention.

Figure 10:
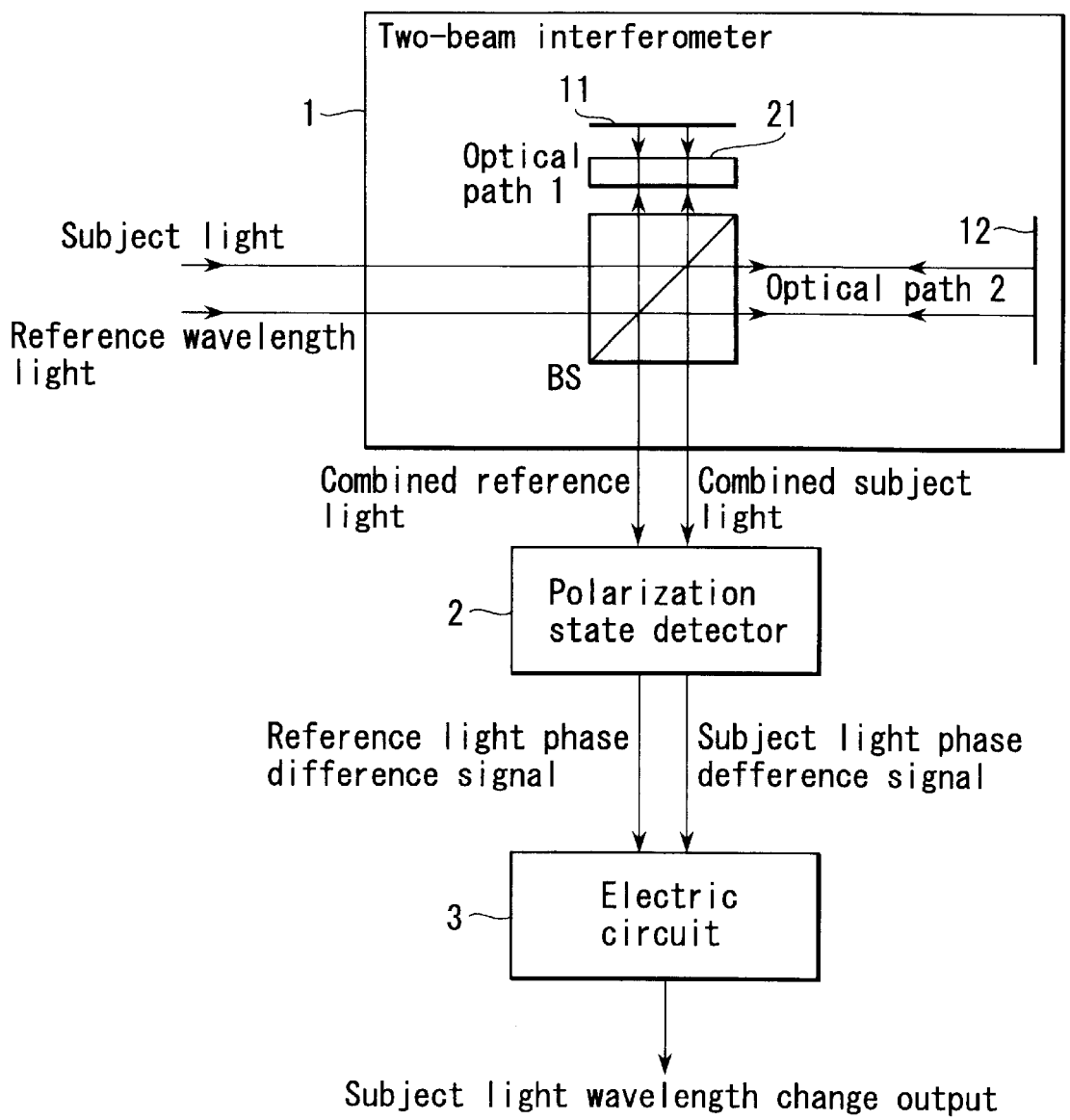
FIG. 10 is a block diagram showing a configuration of a light wavelength measuring apparatus according to a fifth aspect of the present invention.

FIG. 10 shows an embodiment according to the fifth aspect of the present invention. In this embodiment a phase element 21 is interposed in one of the optical paths of a Michelson interferometer.

The two-beam interferometer 1 is fed with a reference light having a stabilized reference wavelength light, via generally the same optical path as for the subject light. A combined light is made for each of these beams and each combined light is fed to the polarization state detector 2.

The polarization state detector 2 converts the combined lights into respective electric signals, and then outputs the signals as phase difference signals.

Here, the phase difference obtained from the reference light is represented by $\Delta\theta r$, the wavelength thereof is represented by $\lambda.r$, the phase difference obtained from the subject light is represented by $\Delta\theta s$, and the wavelength thereof is represented by $\lambda.r$. Then, Expression (2) yields the following Expression (14), making possible to eliminate the optical path length difference x:

$$\lambda_s = \frac{\Delta\theta r}{\Delta\theta s} \cdot \frac{n(\lambda = \lambda s)}{n(\lambda = \lambda r)} \cdot \lambda r \qquad (14)$$

when $\lambda=\lambda s$ and when $\lambda=\lambda r$ in Expression (14), the n represents the refractive index of the two-beam interferometer respectively for the wavelength of the subject light and for the wavelength of the reference light.

The electric circuits 3 uses the same method of calculation as in the embodiment shown in FIG. 5, through which the phase difference is obtained for each of the reference light and the subject light. The wavelength is calculated using Expression (14) and outputted.

It should be noted that the reference light may have a wavelength close to the wavelength of the subject light. With such an arrangement, a ratio of the value n for $\lambda=\lambda s$ to the value n for $\lambda=\lambda r$ can be approximated as equal to 1. Based on this approximation, the wavelength of the subject light can be obtained from a product of a ratio of the two phase difference values and the wavelength of the reference light.

On the other hand, if the above approximation error is not negligible, use is made of the refraction ratio, i.e. the value n for $\lambda=\lambda s$/the value n for $\lambda=\lambda r$, under a certain condition (e.g. in the standard air).

In this case, even if an actual measurement condition differs from the assumption, rate of change in the two refraction index values are generally equal to each other, which means there is no change in the refraction ratio, and therefore no measuring error.

In this way, according to the light wavelength measuring apparatus offered by the fifth aspect of the present invention, use of the reference light makes possible highly accurate measurement of the wavelength, without influence from the variation in the refraction ratio and in the optical path difference.

Next, description will cover the light wavelength measuring apparatus according to the sixth aspect of the present invention.

The light wavelength measuring apparatus according to the sixth aspect of the present invention is the light wavelength measuring apparatus according to the fifth aspect comprising further an actuator which is capable of slightly varying the length of at least one of the optical paths of the two-beam interferometer.

Figure 11:
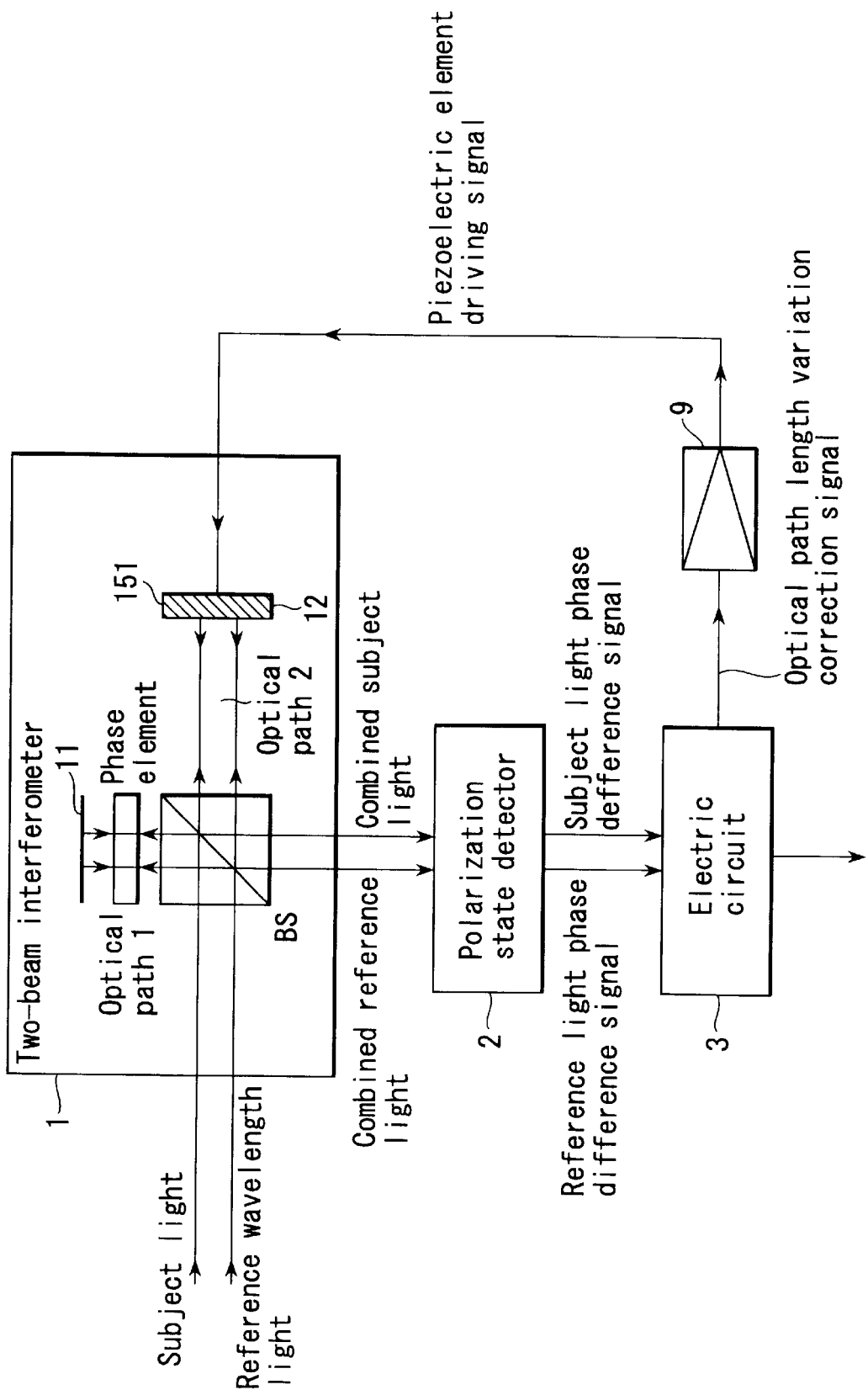
FIG. 11 is a block diagram showing a configuration of a light wavelength measuring apparatus according to a sixth aspect of the present invention.

FIG. 11 shows an embodiment of the light wavelength measuring apparatus according to the sixth aspect of the present invention.

In this embodiment, an actuator 151 is provided by a piezoelectric element which varies thickness in accordance to variation in applied voltage.

The variation in the reference light phase difference signal $\Delta\theta r$ obtained from the polarization state detector 2 corresponds to the variation in the refraction ratio and in the optical path difference in the two-beam interferometer.

Thus, the electric circuit 3 outputs this variation in the signal $\Delta\theta r$, as an optical path length variation correction signal, to a piezoelectric element driver 9.

The piezoelectric element driver 9 coverts the given correction signal into a piezoelectric element drive signal, and outputs the converted signal to the piezoelectric element 151 serving as the actuator.

The piezoelectric element 151 serving as the actuator varies the thickness of the element in accordance with the drive signal, thereby varying the difference in optical path length.

As the difference in optical path length varies, the $\Delta\theta r$ varies.

The optical path length correction signal is fed back to cancel the detected variation of the $\Delta\theta r$.

This feedback loop provides a control so that $\Delta\theta r$ does not vary. Thus, the product of the optical path difference and the reflectance is maintained at a constant value.

In addition to the above, the electric circuits 3 uses the same method of calculation as in the embodiment shown in FIG. 5, through which the wavelength of the subject light is calculated from the subject light phase difference signal, and the obtained value is outputted.

As described, according to the light wavelength measuring apparatus offered by the sixth aspect of the present invention, the feedback control maintains the product of the refractive index n and the optical path difference x at a constant value, and therefore it becomes possible to perform highly accurate measurement of the wavelength.

It should be noted here that according to the above embodiment, the reference light phase difference signal $\Delta\theta r$ is fed back to the piezoelectric element. Alternatively, however, the subject light phase di difference signal $\Delta\theta s$ which is obtained from the combined light made from the subject light may be fed back to the piezoelectric element. (not shown)

In this case, the electric circuit 3 uses Expression (14), treating the subject light phase difference $\Delta\theta s$ as a known constant, and from this Expression (14), the wavelength of the subject light is calculated.

Further, power of the combined light (coherent light power) can be used as a feedback signal (not shown).

In this case, the feedback control keeps the phase not to give a maximum value nor a minimum value to the coherent light power.

By setting frequency response in the feedback control to an sufficiently high level, it becomes possible to make sure that there will not be a jump beyond the maximum value nor the minimum value, into a lock-in to a different phase.

The other of the combined lights which is not used as the feedback signal (the combined light made from the reference light or the combined light made from the subject light) undergoes phase difference detection in the polarization state detector, and is used for the wavelength measurement of the subject light.

If the power of the incident light corresponding to the coherent light (the reference light power or the subject light power) varies, a ratio between the incident-beam power and the coherent-beam power is used as the feedback signal.

According to the above embodiment in which the coherent-beam power is used as the feedback signal, the number of light receivers can be reduced as compared to the earlier embodiment in which polarization of is detected for both beams.

Next, description will be made for a light wavelength measuring apparatuses according to a seventh aspect of the present invention.

The light wavelength measuring apparatuses according to the seventh aspect of the present invention is one of the light wavelength measuring apparatuses according to the fifth or the sixth aspect of the present invention, comprising further a light source which supplies the reference light. The light source is provided by a reference wavelength light source including an absorption cell which absorbs a light of a specific wavelength from the inputted light thereby outputting a light which is locked to this particular wavelength as the reference light.

Figure 12:
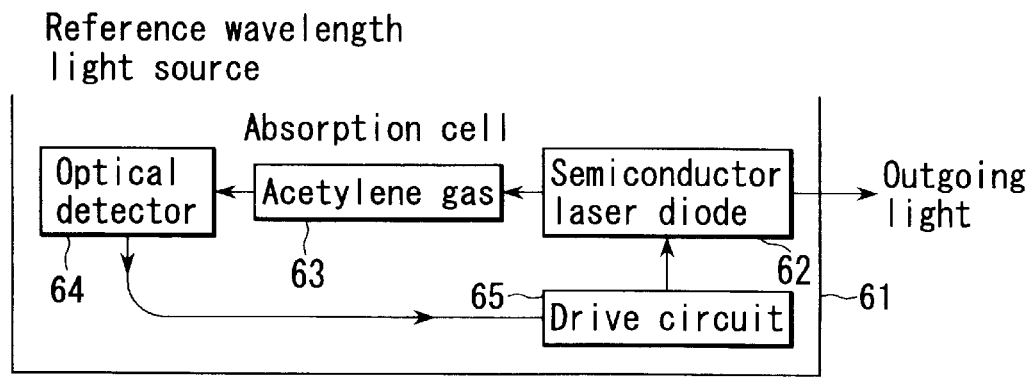
FIG. 12 is a diagram showing a configuration of a reference wavelength light source of a light wavelength measuring apparatus according to a seventh aspect of the present invention.

FIG. 12 shows a configuration of this reference wavelength light source.

As shown in FIG. 12, the reference wavelength light source 61 comprises a semiconductor laser diode 62, an absorption cell 63, a photo detector 64 and a drive circuit 65.

The absorption cell 63 is charged with e.g. acetylene gas which has an absorption band at 1.53 $\mu$m.

When a beam from one of the output surfaces of the semiconductor laser diode 62 is introduced, the absorption cell 63 absorbs a light component of the specific absorption wavelength, allowing the remaining light components of the other wavelengths to pass through.

The photo detector 64 receives and detects the light which has passed the absorption cell 63, converts the detected signal into an electric signal, and outputs the electric signal to the drive circuit 65.

The drive circuit 65 controls a bias current to the semiconductor laser diode 62 based on the electric signal from the photo detector 64, so that an output beam whose wavelength is locked to the absorption band (the specific wavelength) of the absorption cell 63 is coming out of the other output surface of the semiconductor laser diode 62.

Now, use of a reference wavelength light source which is provided with an absorption cell poses problems to be described here below.

Figure 13:
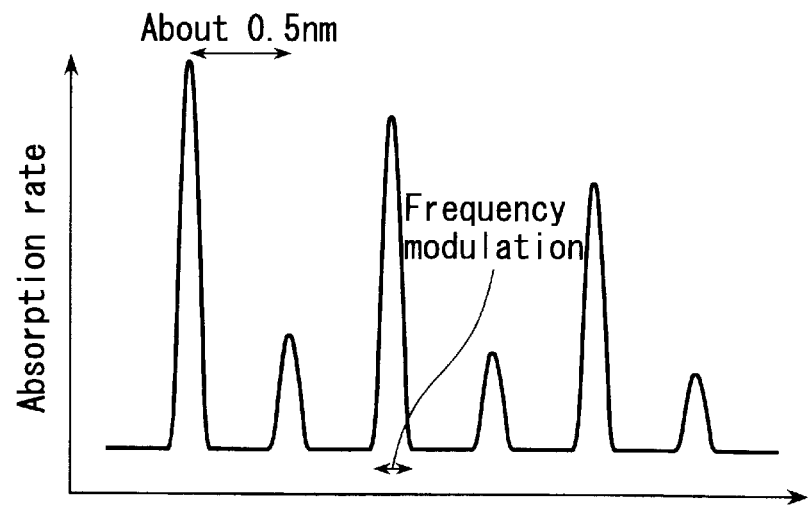
FIG. 13 is a diagram showing an absorption spectrum of acetylene gas to be charged in an absorption cell in the reference wavelength light source in FIG. 12.

For example, the absorption cell charged with acetylene gas has an absorption spectrum as shown in FIG. 13.

In the reference wavelength light source provided with the absorption cell which has such an absorption spectrum, the control is performed so that the wavelength of the outputted beam matches a peak of a specific absorption line of the absorption cell.

Generally, the locking of the wavelength of the outputted beam to a peak of a specific absorption line of the absorption cell is achieved by the following method.

It should be noted here that this method is also utilized in the reference wavelength light source 61 shown in FIG. 12.

Specifically, the output beam wavelength from the source is frequency-modulated, the power of light that has passed the absorption cell is converted by a photoelectric converter into an electric signal (voltage), and the resulting signal is passed through a differential circuit. It is clear from FIG. 14 that the differential circuit voltage curve crosses the 0 bolt (where polarity sign is inverted) when the wavelength of the outputted beam takes the peak wavelength.

In the stabilized-wavelength light source which uses the absorption cell, the bias fed to the light source is controlled so that the output voltage from the differential circuit takes an average value of 0.

As described, in the stabilized-wavelength light source which uses the absorption cell, in order to lock the output beam wavelength from the semiconductor laser diode to a specific absorption line, the output beam is frequency-modulated to stabilize an time-average wavelength.

For this reason, if such a beam is directly used as the reference light source of the two-beam interferometer, the optical path length is detected as if it is varying, although it is not varying in fact. This can decrease measuring accuracy.

A note should be made for an alternative method in the configuration shown in FIG. 12. Specifically, an external modulator which uses an acoustic-optic element for example may be disposed between the semiconductor laser diode and the absorption cell, and the frequency modulation is performed only to the beam to be inputted to the absorption cell, of the lights coming out of the semiconductor laser diode.

In this case, the above problem is avoided since the output beam coming out of the reference wavelength light source is not modulated.

However, the reference wavelength light source of this type is generally expensive.

Light wavelength measuring apparatuses according to eighth and ninth aspects of the present invention, which will be described below are invented to solve the above problems.

The light wavelength measuring apparatus according to the eighth aspect of the present invention uses the reference wavelength light source used in the light wavelength measuring apparatuses according to the sixth aspect which has the above described problems, and uses a beam locked to a specific wavelength of the absorption cell. However, the problems are solved by the following method.

Specifically, the feedback loop frequency response for the actuator drive of the light wavelength measuring apparatuses according to the sixth aspect is set to a value which is sufficiently lower than the modulation frequency of the baseline-wavelength reference light (not shown).

With the above arrangement, according to the light wavelength measuring apparatus offered by the eighth aspect of the present invention, the frequency modulation of the reference light no longer influences the optical path length control of the two-beam interferometer. Therefore, a highly accurate wavelength measurement can be achieved.

Next, description will be made for a light wavelength measuring apparatus according to the ninth aspect of the present invention.

Figure 15:
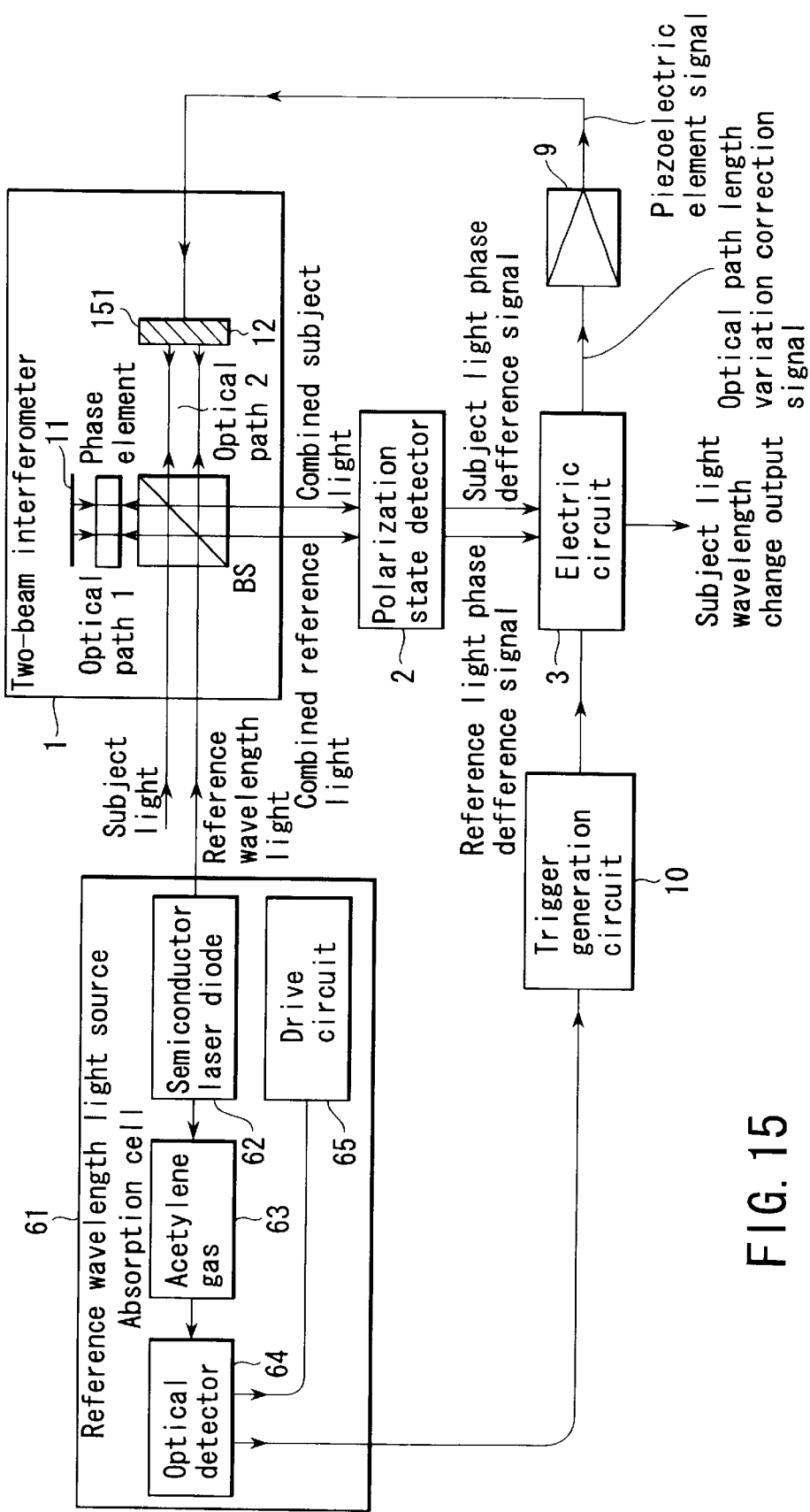
FIG. 15 is a block diagram showing a configuration of a light wavelength measuring apparatus according to a ninth aspect of the present invention.

FIG. 15 shows a specific embodiment of the light wavelength measuring apparatus according to the ninth aspect.

The output signal from the photo detector in the reference wavelength light source is compared by a trigger generating circuit 10 with a certain reference level, and a trigger signal is outputted to the electric circuit 3.

Figure 14:
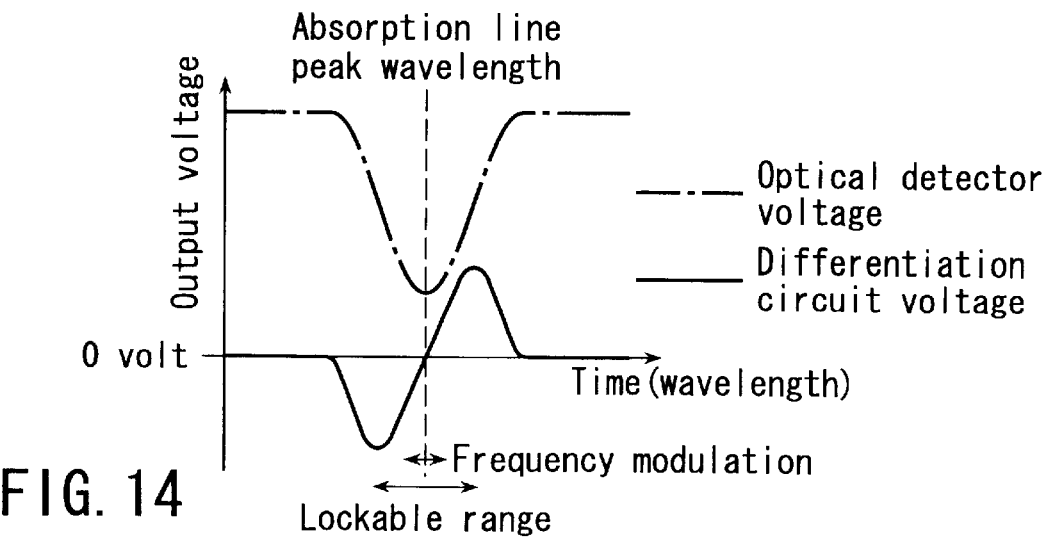
FIG. 14 is a diagram showing a relationship among a wavelength of an out-coming light, optical detector voltage and a differential signal thereof.

As shown in FIG. 14, the output signal from the photo detector corresponds to the output beam wavelength from the reference wavelength light source. Therefore, the trigger is generated at a moment when the wavelength of the output beam coming out of the reference wavelength light source is identical with the baseline wavelength.

The electric circuit 3 calculates and outputs the wavelength of the subject light, using the combined light phase difference signal of the combined light at the moment when the trigger is generated.

As a result, the apparatus always uses a reference light whose wavelength is identical with the wavelength of a certain baseline wavelength. This eliminates the problems mentioned above, making possible a highly accurate wavelength measurement.

There is an alternative for the trigger generation circuit 10. As understood from FIG. 14, the signal resulting from the differentiation of the photo detector output signal also corresponds to the output wavelength of the reference light source. Therefore, use may be made of a circuit which generates the trigger when the differential signal is identical with a baseline level. (not shown)

Now, in all of the light wavelength measuring apparatuses according to the first through the ninth aspects of the present invention, there is still the following problem.

Specifically, according to the light wavelength measuring apparatus offered by the first aspect of the present invention, it was described that in the process of obtaining the phase difference $\Delta\theta$ of the combined light, the integer portion of the $\Delta\theta/2\pi$ is selected from values stored in advance in the controller, (or alternatively, a value obtained from an initial wavelength value inputted by the user is used.)

Therefore, if the integer portion of the $\Delta\theta/2\pi$ used in the calculation has a different value from the actual one, the measured wavelength will also be different from the actual wavelength.

Such a measuring error as the above is not problematic in an application in which real-time measurement of an amount of the relative wavelength variation is important but there is not much importance placed on the accuracy of the absolute wavelength.

However, in an application in which both of the real-time measurement of an amount of the wavelength variation and the accuracy in the absolute wavelength are important, the above-described error is problematic.

A light wavelength measuring apparatuses according to a tenth aspect of the present invention, which will be described below, is invented to solve the above problem.

Figure 16:
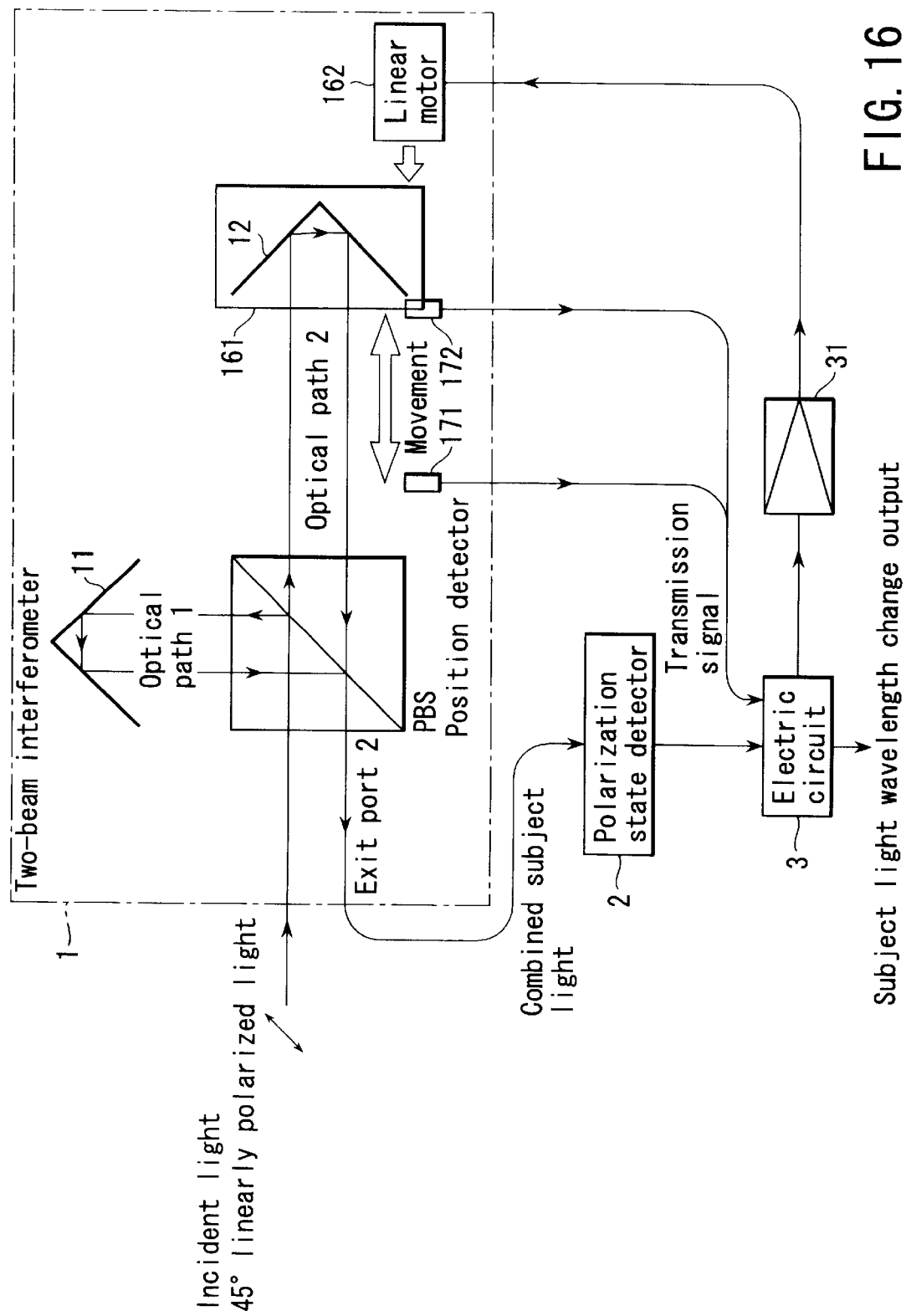
FIG. 16 is a block diagram showing a configuration of a light wavelength measuring apparatus according to a tenth aspect of the present invention.

FIG. 16 shows a first embodiment of the light wavelength measuring apparatus according to the tenth aspect of the present invention.

The two-beam interferometer is provided by a Michelson interferometer 1 which uses a polarization beam splitter PBS, whose reflection mirror 102 is mounted on a moving stage 161 capable of moving linearly in an optical axis.

The moving stage 161 is detected by two position detectors 171 and 172 which are provided on a substrate and output stage passing signals to the electrical circuit 3.

The position detector 171 is located at a place where the optical path difference of the Michelson interferometer 1 is 0 when the moving stage is positioned at the location where the position detector 171 is placed.

The position detector 172 is located at a place where the optical path difference of the Michelson interferometer 1 is a predetermined optical path difference x when the moving stage 161 is positioned at the location where the position detector 172 is placed.

The moving stage 161 is connected to a linear motor 162 driven by a driver circuit 31, and is moved in accordance with a drive signal from the electric circuit 3.

Upon a measurement start command from the user, the electric circuit 3 moves the moving stage 161 toward the position detector 171.

The electric circuit 3 incorporates a counter (not illustrated) which counts the integer portion of the $\Delta\theta/2\pi r$. The counter is reset to 0 upon reception of the stage passing signal outputted by the position detector 171.

The electric circuit 3 confirms that the counter has been reset, and then begins to move the movable state 161 toward the position detector 172.

During this movement, the electric circuit 3 performs real time calculation of the decimal portion of the $\Delta\theta/2\pi$ based on the polarization state of the combined light coming out of the polarization state detector 2, and adds one to or subtracts one from the integer count of the integer counter according to an overflow or an underflow of the decimal portion.

Upon reception of the stage passing signal from the position detector 172, the electric circuit 3 stops the movement of the moving stage 161.

Then, the count of the integer portion of the $\Delta\theta/2\pi$ is added to the real time value of the decimal portion thereof, to present a total phase difference. This value is put to Expression (11) to obtain the absolute wavelength of the subject light, and the absolute wavelength obtained is then outputted concomitantly.

If the moving stage 161 cannot be stopped accurately at the position where the position detector 172 is located, due to backlash for example in the drive mechanism, then the control is provided in such a way that the stage moving direction is reversed for every reception of the stage passing signal from the position detector 172, so that the moving stage is always located near the position detector 172.

With the above arrangement, the count of the integer portion of the $\Delta\theta/2\pi$ which has been latched by the trigger provided by the stage passing signal is added to the decimal portion, in the same way as described above, to calculate the absolute wavelength of the subject light, and the absolute wavelength obtained is then outputted concomitantly upon reception of the trigger.

In this way, the integer portion of the $\Delta\theta/2\pi$ is calculated accurately. Thus, it becomes possible to achieve a highly accurate measurement of the wavelength.

It should be noted here that the location of the position detector 171 may not necessarily be at a point where the optical path difference of the two beams is 0, as long as the location represents a known value.

Calculation of the absolute wavelength uses the optical path difference x0, which is the optical path difference when the moving stage is located at the position of the position detector 172. The calculation is made by using Expression (11), by substituting x with (x−x0).

In the present embodiment which makes use of the position detector described as above, it is necessary that the mounting locations of the position detectors are maintained highly accurately and highly stably. However, this problem is solved by a second embodiment of the light wavelength measuring apparatus offered by the tenth aspect of the present invention, to be described next.

Figure 17:
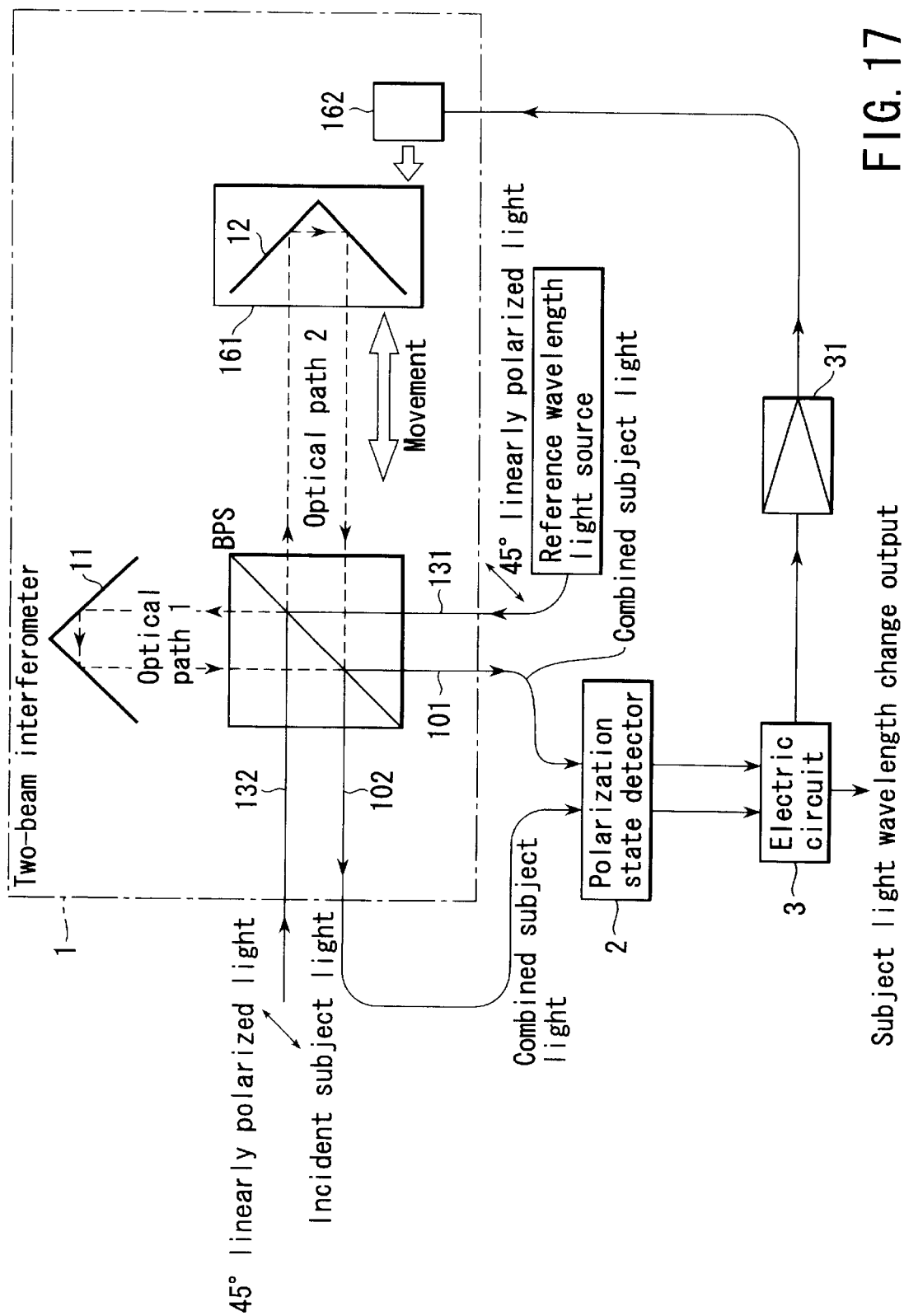
FIG. 17 is a block diagram showing a configuration of a light wavelength measuring apparatus as another embodiment according to the tenth aspect of the present invention.

FIG. 17 shows the second embodiment of the light wavelength measuring apparatus offered by the tenth aspect of the present invention.

The two-beam interferometer is provided by a Michelson interferometer which uses a polarization beam splitter PBS as the beam splitter/combiner. As in the previous embodiment, a reflection mirror 12 is mounted on the moving stage 161, which is moved by the linear motor 162 and the driver circuit 31 in the direction of the optical axis.

The subject light which is the 45-degree linearly polarized light and the baseline-wavelength reference light are introduced from an entrance port 132 and an entrance port 131 respectively into the polarization beam splitter PBS.

This particular polarization beam splitter PBS allows the P polarization component to pass through, but reflects the S polarization component.

The S polarization component of the subject light is reflected by the polarization beam splitter PBS and the P polarization component of the reference light is passed through the polarization beam splitter PBS. Then they travel through the optical path 1, and via the reflection mirror 11, enter again into the polarization beam splitter PBS.

Likewise, the P polarization component of the subject light is passed through the polarization beam splitter PBS and the S polarization component of the reference light is reflected by the polarization beam splitter PBS. Then they travel through the optical path 2, and via the reflection mirror 12, enter again into the polarization beam splitter PBS.

Incident point and angle for each of the lights are adjusted so that the subject light and the reference light merge with each other generally completely in each of the optical path 1 and the optical path 2.

The subject light and the reference light which have entered the polarization beam splitter PBS are combined into a combined subject light and a combined reference light, then they come out of an exit ports 102 and 101 respectively, and enter the polarization state detector 2.

Each of the combined lights inputted to the polarization state detector undergoes the polarization detection process, and then outputted respectively, in the form of electrical signals, to the electrical circuit 3.

Upon a measurement start command from the user, the electric circuit 3 moves the moving stage 161 toward a position where the optical path difference becomes 0, and reads a power value of the combined reference light which is sent from the polarization state detector.

Figure 18:
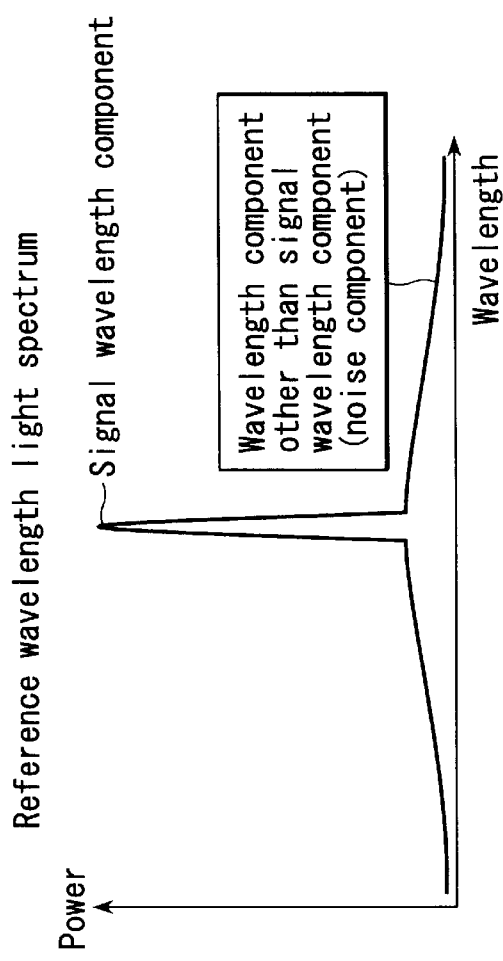
FIG. 18 is a diagram showing a spectrum of a reference light applied to the present invention.

As shown in FIG. 18, the baseline-wavelength reference light includes a noise component in addition to the signal wavelength component.

Figure 19:
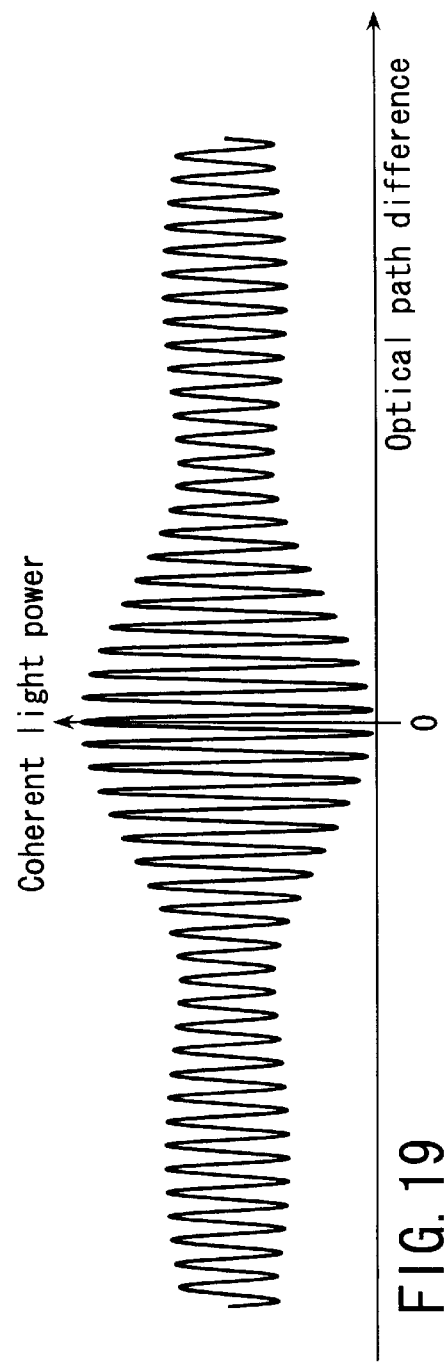
FIG. 19 is diagram showing a relationship between an optical path difference and a coherent light power of a combined light of the reference light applied to the present invention, in the vicinity of 0 of an optical path difference.

With the above, when the optical path difference in the Michelson interferometer 1 is varied, as shown in FIG. 19, coherent light power (the power of the combined reference light) attains a peak at a position where the optical path difference is 0.

The electric circuit 3 incorporates counters (not shown) which count the integer portion of the $\Delta\theta/2\pi$ respectively for the subject light and the reference light. The counters are reset to 0 at a moment when the power of the combined reference light has attained the peak.

The electric circuit 3 confirms that the power of the combined reference light has attained the peak, and then begins to move the moving stage until the reference light phase difference $\Delta\theta r$ achieves a certain predetermined value.

During this movement, the counting of the phase difference of the reference light and the subject light including the respective decimal portions is continued, as in the previous embodiment.

When the reference light phase difference $\Delta\theta r$ has achieved the predetermined value, the electric circuit 3 stops the movement of the moving stage, and continues with the counting of the phase differences.

The electric circuit 3 puts the phase differences obtained through the counting to Expression (14) to calculate concomitant absolute wavelength of the subject light, and the absolute wavelength thus obtained is then outputted.

In this way, the second embodiment of the light wavelength measuring apparatus according to the 10th aspect of the present invention enables to solve the problem as described above, and to achieve a highly accurate real-time measurement of the absolute wavelength.

The above description covers the two specific embodiments of the light wavelength measuring apparatus according to the 10th aspect of the present invention.

According to these embodiments, in which the optical path difference can be varied in a wide range, it is possible to output an obtained spectrum of the subject light. In this case, the electric circuit 3 performs inversed Fourier transformation to an obtained relationship between the optical path difference and the polarization of the combined light.

Now, in all of the light wavelength measuring apparatuses according to the first through the tenth aspects of the present invention, there is still the following problem.

Specifically, according to the light wavelength measuring apparatuses offered by the first through the tenth aspects of the present invention, if the polarization of the incident light varies, the polarization of the combined light also varies, resulting in a measuring error.

This problem can be solved by providing a polarizer, for example, at a beam entrance portion of the two-beam interferometer, so that the variation in the polarizing status of the combined light is prevented.

However, this arrangement poses another problem. Specifically, if the beam only has a polarized component perpendicular to the transmission axis of the polarizer, the combined light has 0 power, making the measurement impossible.

A light wavelength measuring apparatuses according to an eleventh aspect of the present invention, which will be described below, is invented to solve the above problem.

Figure 20:
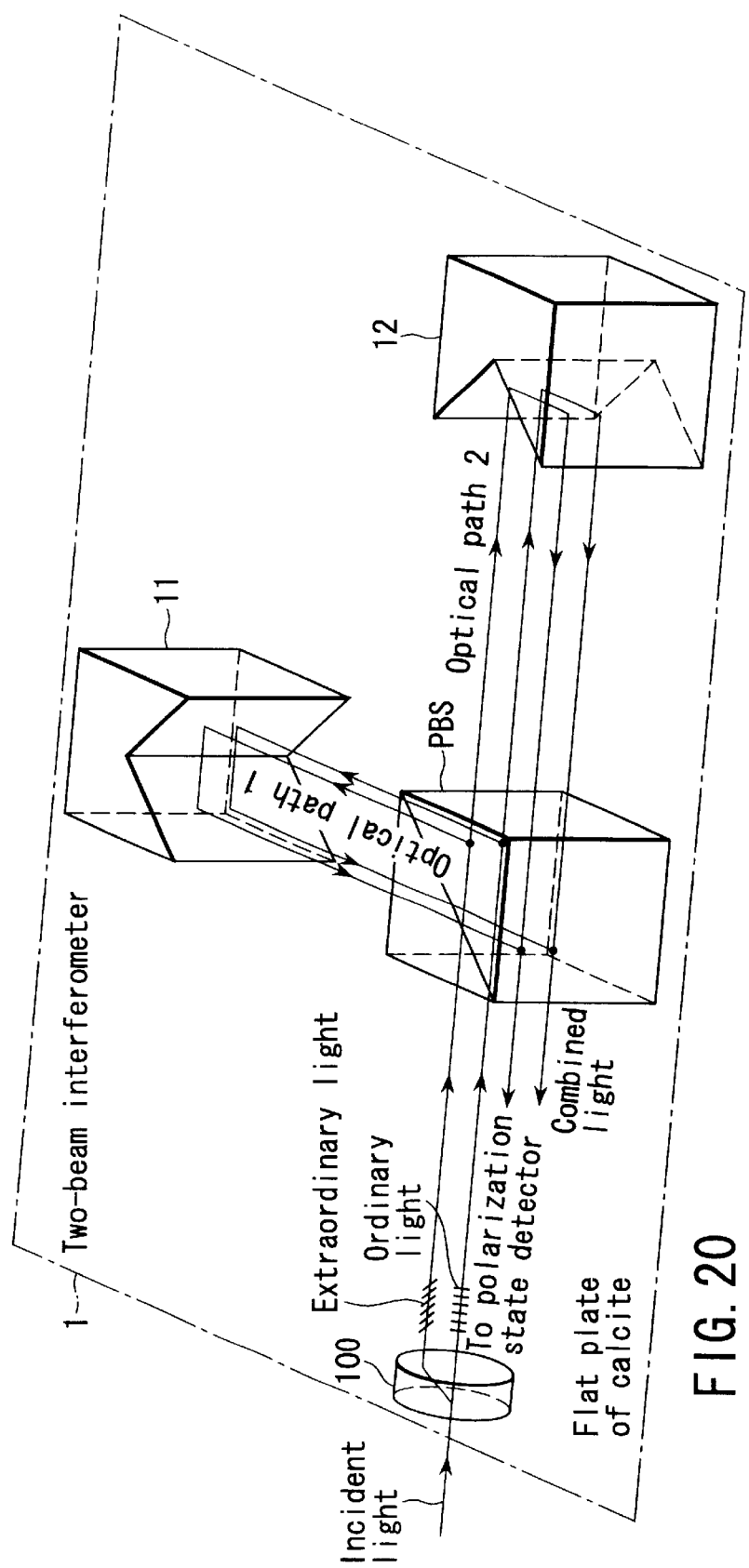
FIG. 20 is a diagram showing a configuration of a two-beam interferometer used in a light wavelength measuring apparatus according to an eleventh aspect of the present invention.

FIG. 20 shows a specific embodiment of the two-beam interferometer 1 according to the light wavelength measuring apparatus offered the eleventh aspect of the present invention.

In this specific embodiment, a flat plate of calcite 100 serving as a double-image polarizing element is provided at a light entering portion of the two-beam interferometer 1.

The beam which enters the doubling polarizer provided by the flat plate of calcite 100 is separated into two polarized components which are perpendicular to each other, i.e. ordinary beam Po and extraordinary beam Pe, and then the separated beams are introduced to the Michelson interferometer which incorporates a polarization beam splitter PBS serving as a beam splitter/combiner.

The flat plate of calcite 100 serving as the doubling polarizer is placed to polarize the ordinary beam and the extraordinary beam at ±45 degrees with respect to the horizontal and vertical axis's.

Figure 21:
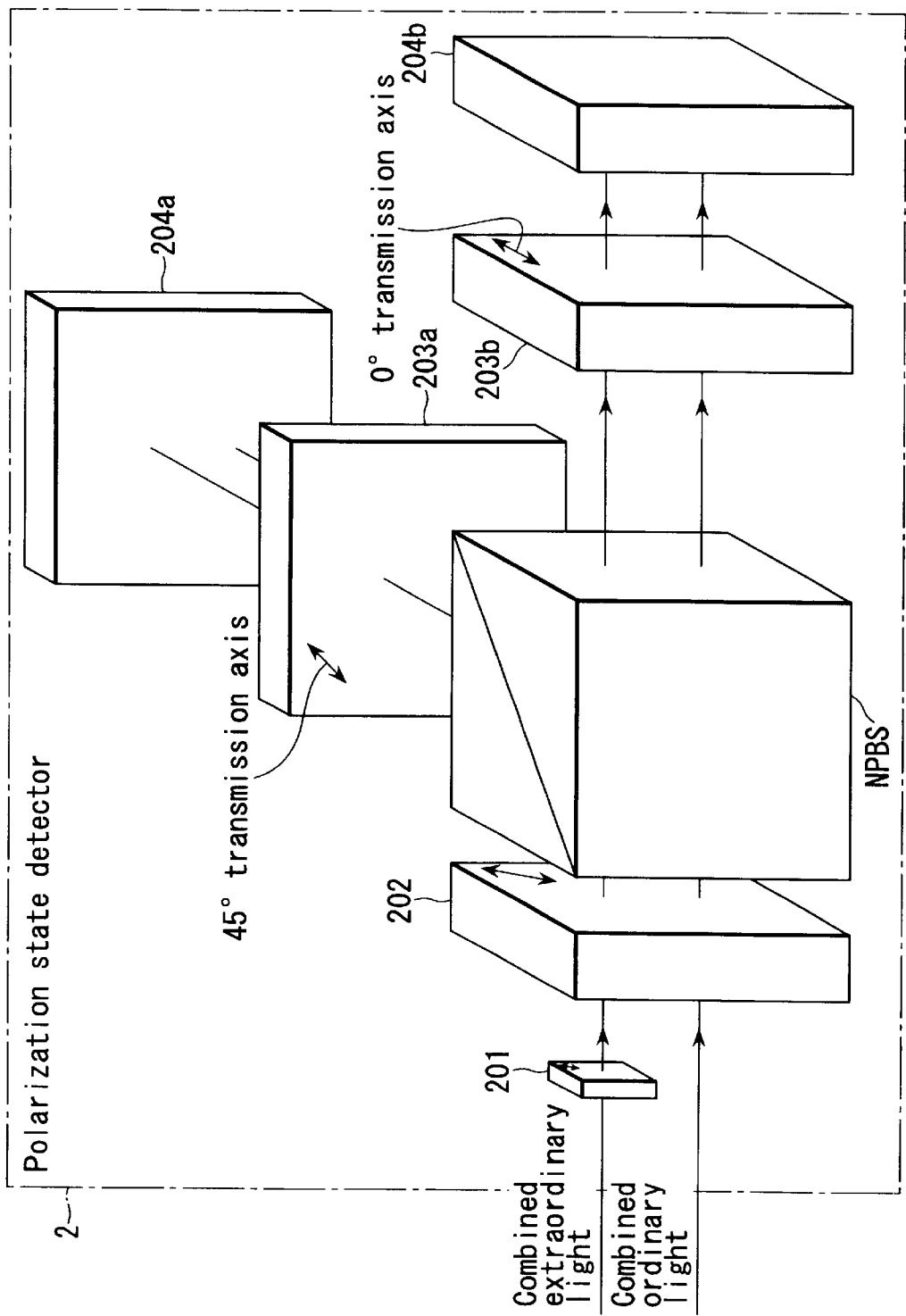
FIG. 21 is a diagram showing a configuration of a polarization state detector 2 of the light wavelength measuring apparatus according to the eleventh aspect of the present invention.
Figure 23:
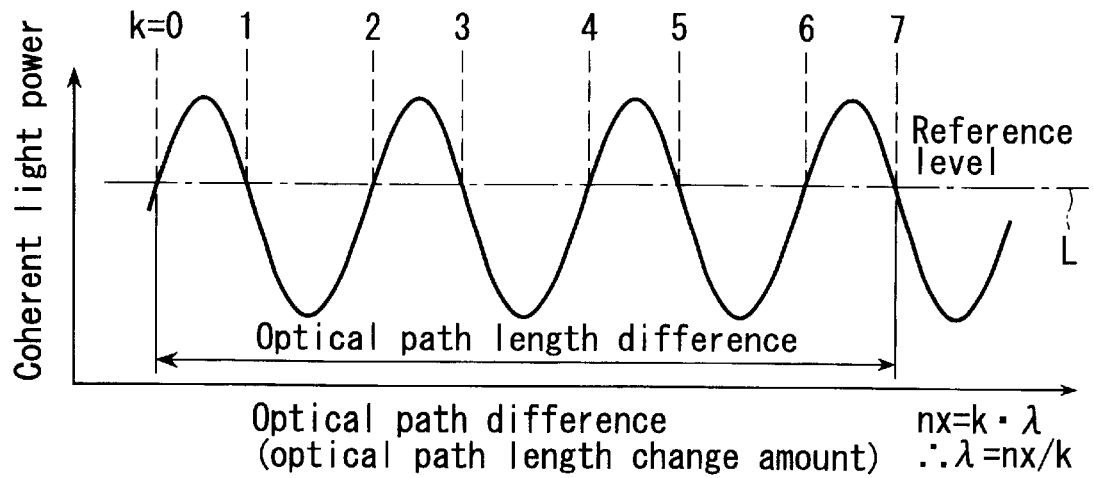
FIG. 23 is a diagram showing an optical path difference and an coherent light power according to the light wavelength measuring apparatus in FIG. 22A.
Figure 24:
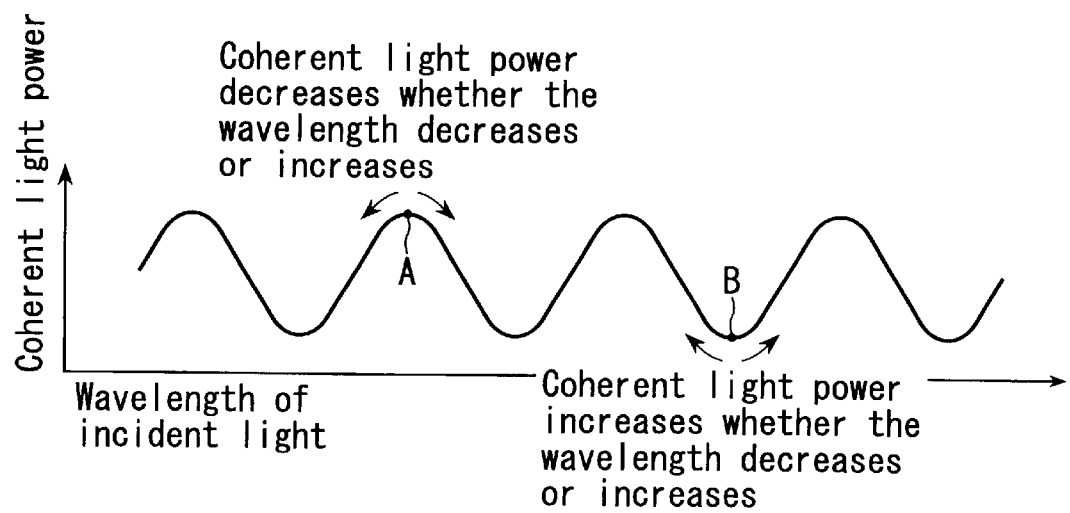
FIG. 24 is a diagram showing a relationship between wavelength of an incident and coherent light power when the optical path difference is fixed in the light wavelength measuring apparatus in FIG. 22A.

The Michelson interferometer outputs a combined light of the ordinary beam and the extraordinary beam, which is then entered into the polarization state detector 2 as shown in FIG. 21.

The combined light of the ordinary beam and the extraordinary beam which is entered into the polarization state detector 2 has a polarization state which varies, with a 180-degree phase difference, on a circular orbit around the point of origin on the UV plane as the phase difference varies.

FIG. 21 shows a configuration example of the polarization state detector 2 used here.

The combined extraordinary beam coming into the polarization state detector 2 is passed through a 45-degree half-wavelength plate 201, thereby transformed into the same polarization as the combined ordinary beam.

The combined extraordinary beam thus transformed into the same polarization as the combined ordinary beam, is transformed, together with the combined ordinary beam, by a 45-degree quarter-wavelength plate 202, into a polarization state which varies on a circular orbit around the point of origin on the QU plane as the phase difference varies.

The combined light as after the polarization transformation is split by a non-polarizing beam splitter NPBS.

The beams as after the splitting by the non-polarizing beam splitter NPBS are detected respectively by analyzers 203a and 203b having respective transmission axis at 0 degree and 45 degrees, and then converted into electrical signals.

As shown in FIG. 21, the combined extraordinary beam and the combined ordinary beam as after the detection by the analyzers 203a and 203b keeps traveling while being kept off from each other to avoid merging, and then entered into photo detectors 204a and 204b. Therefore, power variation due to interference is avoided, and a sum of the light powers is outputted.

In this case, even if there is a change in the polarization state of the incident light, power change in the ordinary beam and the extraordinary beam are complementary to each other, and therefore the beam powers entered into the photo detectors 204a and 204b do not change.

The electric signals converted by the photo detectors are outputted to the electric circuit 3 as shown in FIG. 1 for example.

The electric circuit 3 uses the same method as described for the embodiment of the light wavelength measuring apparatus according to the first aspect, thereby calculating the wavelength of the subject light, and outputs the result.

It should be noted that the ordinary beam and the extraordinary beam as after the detection may be converted by separate photo detectors into electric signals, and then a sum of these signals may be used (not shown).

Obviously, the combined extraordinary beam and the combined ordinary beam may be passed separately through individual polarization state detectors to obtain their respective phase differences, and the phase difference which has a greater power may be used for the wavelength calculation of the inputted beam. (not shown)

Further, the above method may be applied to the light wavelength measuring apparatus which includes a reference wavelength light source. Then, it becomes possible to perform highly accurate wavelength measurement even if the reference light does not have a stable polarization state. (not shown)

As has been described, according to the light wavelength measuring apparatuses offered by the eleventh aspect, it becomes possible to prevent wavelength measuring error due to variation in the polarization state of the incident light, and therefore to achieve accurate measurement of the wavelength.

Thus, as has been clear from the above description, according to the first aspect of the present invention, without moving the movable mirror as in the conventional light wavelength measuring apparatus, it becomes possible to provide a light wavelength measuring apparatus capable of performing a quick measurement of the wavelength of the subject light, by using a two-beam interferometer which, unlike in the prior art, does not require the movement of the movable mirror when measuring an amount wavelength change of the incident light, is capable of properly measuring the amount of wavelength change of the incident light through real-time measurement of how much and in which of the increasing or decreasing directions the wavelength has changed.

According to the second aspect of the present invention, it becomes possible to provide a light wavelength measuring apparatuses capable of performing highly accurate measurement of a subject light, whatever the wavelength of the subject light may be.

Further, the light wavelength measuring apparatuses according to the third aspect of the present invention enables to perform highly accurate measurement of the wavelength over a wide range of wavelength.

Further, the light wavelength measuring apparatuses according to the fourth aspect of the present invention enables to prevent unnecessary reflection of light on surfaces of components tightly assembled together. Further, it becomes possible to reduce measuring error due to variation in the refraction index of air caused by atmospheric pressure change.

Still further, since each component is maintained at a constant temperature, it becomes possible to prevent adverse affect from thermal expansion of the optical components can be prevented.

The light wavelength measuring apparatuses according to the fifth aspect of the present invention enables to prevent adverse affect from optical path variation and refraction index variation in the two-beam interferometer.

The light wavelength measuring apparatuses according to the sixth aspect of the present invention enables to maintain a constant optical path difference of the two-beam interferometer, and to perform highly accurate measurement of the wavelength of a subject light.

The light wavelength measuring apparatuses according to the seventh aspect of the present invention uses a reference wavelength light source which outputs, as the reference light, a beam whose wavelength is locked to a specific wavelength absorbed by a light absorption cell. Therefore, it becomes possible to perform highly accurate measurement of the wavelength of a subject light.

The light wavelength measuring apparatuses according to the eighth aspect of the present invention enables to maintain a constant optical path difference, without influence from the frequency modulation of the output beam from the reference wavelength light source. Therefore, it becomes possible to perform highly accurate measurement of the wavelength of a subject light.

The light wavelength measuring apparatuses according to the ninth aspect of the present invention, the wavelength of the subject light is calculated from a polarization state of the combined light combined when the frequency-modulated reference light from the reference wavelength light source has attained a specific wavelength. Therefore, it becomes possible to perform highly accurate measurement of the wavelength of a subject light.

The light wavelength measuring apparatuses according to the tenth aspect of the present invention enables to perform highly accurate real-time measurement of the absolute wavelength of the subject light.

The light wavelength measuring apparatuses according to the eleventh aspect of the present invention enables to prevent adverse affect to measurement result caused by variation in the polarization state of a subject light.

According to the twelfth aspect of the present invention, it becomes possible to provide a light wavelength measuring method which enables to perform highly accurate real-time measurement of the absolute wavelength of a subject light.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A light wavelength measuring apparatus comprising:
   a two-beam interferometer which splits an incident light in two optical paths, combines and outputs split lights together again, the two-beam interferometer being configured to generate at least one or more combined light made from two beams having polarization states different from each other;
   a polarization state detector which detects a variation in the polarization state of the combined light generated by the two-beam interferometer; and
   an electric circuit which calculates a wavelength of the incident light based on the variation in the polarization state of the combined light detected by the polarization state detector,
   wherein a difference in length between the two optical paths of the two-beam interferometer of a point of splitting the incident light and a point of combining the split lights is fixed, for a detection of polarization variation in the combined light according to a wavelength variation of the incident light by the polarization state detector.

2. The light wavelength measuring apparatus according to claim 1, wherein at least one of the two optical paths in the two-beam interferometer, from the point of splitting the incident light to the point of combining the split lights, is provided with an optical element which transforms the incident light into a different polarization state.

3. The light wavelength measuring apparatus according to claim 1, wherein the two-beam interferometer uses a polarization beam splitter as a beam splitter/combiner which splits the incident light into two, combines and outputs the split lights together again.

4. The light wavelength measuring apparatus according to claim 1, wherein a plurality of optical components used in the two-beam interferometer are disposed in tight abutment together on the optical paths in the two-beam interferometer, from the point of splitting the incident light to the point of combining the split lights, a temperature adjusting mechanism being provided for maintaining the optical components at a constant temperature.

5. The light wavelength measuring apparatus according to claim 1, wherein the two-beam interferometer is supplied with a reference light which has a stabilized wavelength, in generally the same optical path as for the subject light, generally simultaneously with the subject light;
   the polarization state detector detects a polarization state for each of the combined light of the subject light coming out of the two-beam interferometer and the combined light of the reference light;
   a correction is made to an amount of variation in the optical path length included in the polarization state of the subject light, based on the polarization state of the combined light of the subject light and the combined light of the reference light detected by the polarization state detector.

6. The light wavelength measuring apparatus according to claim 5, wherein the two-beam interferometer comprises an actuator which slightly varies the length of at least one of the optical paths, the actuator is subjected to a feedback control based on the polarization or an interference light component, of one of the combined light of the subject light and the combined light of the reference light coming out of the two-beam interferometer.

7. The light wavelength measuring apparatus according to claim 6, further comprises a light absorbing cell which absorbs a light of a specific wavelength, and a reference wavelength light source which outputs as the reference light a beam whose wavelength is locked to the specific wavelength absorbed by the light absorption cell.

8. The light wavelength measuring apparatus according to claim 7, wherein the light from the reference wavelength light source is frequency-modulated at a predetermined modulation frequency while being locked at the specific wavelength, frequency response of a circuit to drive the actuator which provides a variable control on the optical path length is set to a frequency sufficiently lower than the predetermined modulation frequency.

9. The light wavelength measuring apparatus according to claim 7, further comprising a photo detector which detects a light coming out of the absorption cell, and a trigger generation circuit which generates a trigger when an output signal from the photo detector or a differential signal of said output signal is identical with a specific level, wherein the electric circuit outputs a wavelength of the subject light, in synchronization with the trigger generated by the trigger generation circuit.

10. The light wavelength measuring apparatus according to claim 1, wherein the two-beam interferometer comprises an optical path varying mechanism which varies the length of at least one of the two optical paths, the polarization state detector detects a first amount of variation in the polarization state of the combined light caused when the optical path length varying mechanism varies the optical path length by a predetermined distance, for a detection of an absolute value of wavelength of the incident light, and a second amount of variation in the polarization state of the combined light caused by a wavelength variation in the subject light when the optical path length is fixed, for a detection of polarization condition according to a wavelength variation of the incident light, the electric circuit performs real-time measurement of an absolute wavelength of the subject light, based on the first and second amounts of variation detected by the polarization state detector.

11. The light wavelength measuring apparatus according to claim 1, wherein the two-beam interferometer has a light entering portion provided with a double-image polarizing element which separates the incident light into lights of first and second polarization components which are perpendicular to each other.

12. A light wavelength measuring method comprising:

preparing a two-beam interferometer which splits an incident light in two optical paths, combines and outputs the split lights together again, the two-beam interferometer generating at least one combined light made from two beams having polarization states different from each other;

detecting a first amount of variation in the polarization state of the combined light caused by the variation in the optical path length by the predetermined distance;

detecting a second amount of variation in the polarization state of the combined light caused by a wavelength variation in the subject light when an optical path length of at least one of the two optical paths in the two-beam interferometer is fixed;

varying an optical path length of at least one of the two optical paths in the two-beam interferometer, by a predetermined distance; and performing a real-time calculation of a wavelength of the incident light based on the first and the second amounts of variation.

* * * * *